(12) United States Patent
Stolz

(10) Patent No.: US 6,579,027 B1
(45) Date of Patent: Jun. 17, 2003

(54) DEVICE FOR CONNECTING A TOOL HEAD TO A CLAMPING SHANK

(75) Inventor: Gerhard Stolz, Ingersheim (DE)

(73) Assignee: Komet Praezisionwerkzeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 09/600,811

(22) PCT Filed: Jan. 21, 1999

(86) PCT No.: PCT/EP99/00380
§ 371 (c)(1),
(2), (4) Date: Jul. 21, 2000

(87) PCT Pub. No.: WO99/37428
PCT Pub. Date: Jul. 29, 1999

(30) Foreign Application Priority Data

| Jan. 23, 1998 | (DE) | 198 02 334 |
| May 14, 1998 | (DE) | 198 21 484 |
| Nov. 13, 1998 | (DE) | 198 52 397 |
| Dec. 24, 1998 | (DE) | 198 60 184 |

(51) Int. Cl.[7] .............................. B23B 31/107
(52) U.S. Cl. ................... 403/297; 403/257
(58) Field of Search ................. 403/297, 251, 403/321, 249, 257, 373, 374.2, 374.1, 31

(56) References Cited

U.S. PATENT DOCUMENTS 4,549,832 A * 10/1985 Sterl ............... 403/264 X
4,907,388 A * 3/1990 Siahatgar ............... 403/252 X
5,150,995 A * 9/1992 Reinauer ............... 403/297 X
5,657,604 A * 8/1997 Malott ................. 403/297 X

FOREIGN PATENT DOCUMENTS

| DE | 39 04 259 | 8/1990 |
| DE | 90 11 831.6 | 2/1992 |
| DE | 41 10 720 | 10/1992 |
| DE | 92 12 205.1 | 1/1993 |
| DE | 42 21 735 | 3/1993 |
| DE | 42 39 373 | 6/1993 |
| DE | 42 20 873 | 1/1994 |
| DE | 42 28 558 | 2/1994 |
| DE | 43 03 608 | 8/1994 |
| DE | 196 00 089 | 7/1997 |
| DE | 197 53 663 | 6/1999 |
| WO | WO 95/16533 | 6/1995 |

* cited by examiner

Primary Examiner—Lynne H. Browne
Assistant Examiner—John R. Cottingham
(74) Attorney, Agent, or Firm—Flynn, Thiel, Boutell & Tanis, P.C.

(57) ABSTRACT

A clamping mechanism connects a tool head including a hollow tool shank with a clamping shank having a seat for receiving the tool shank. Each of the face ends of the clamping elements of the clamping mechanism are overlapped by at least one centering element. The centering elements are connected to each other by axially parallel links forming a centering cage that overlaps the clamping mechanism with axial play. The centering elements each lock into an axially central, cylindrical recess situated in the floor area of the clamping shank and the hollow tool shank.

82 Claims, 13 Drawing Sheets

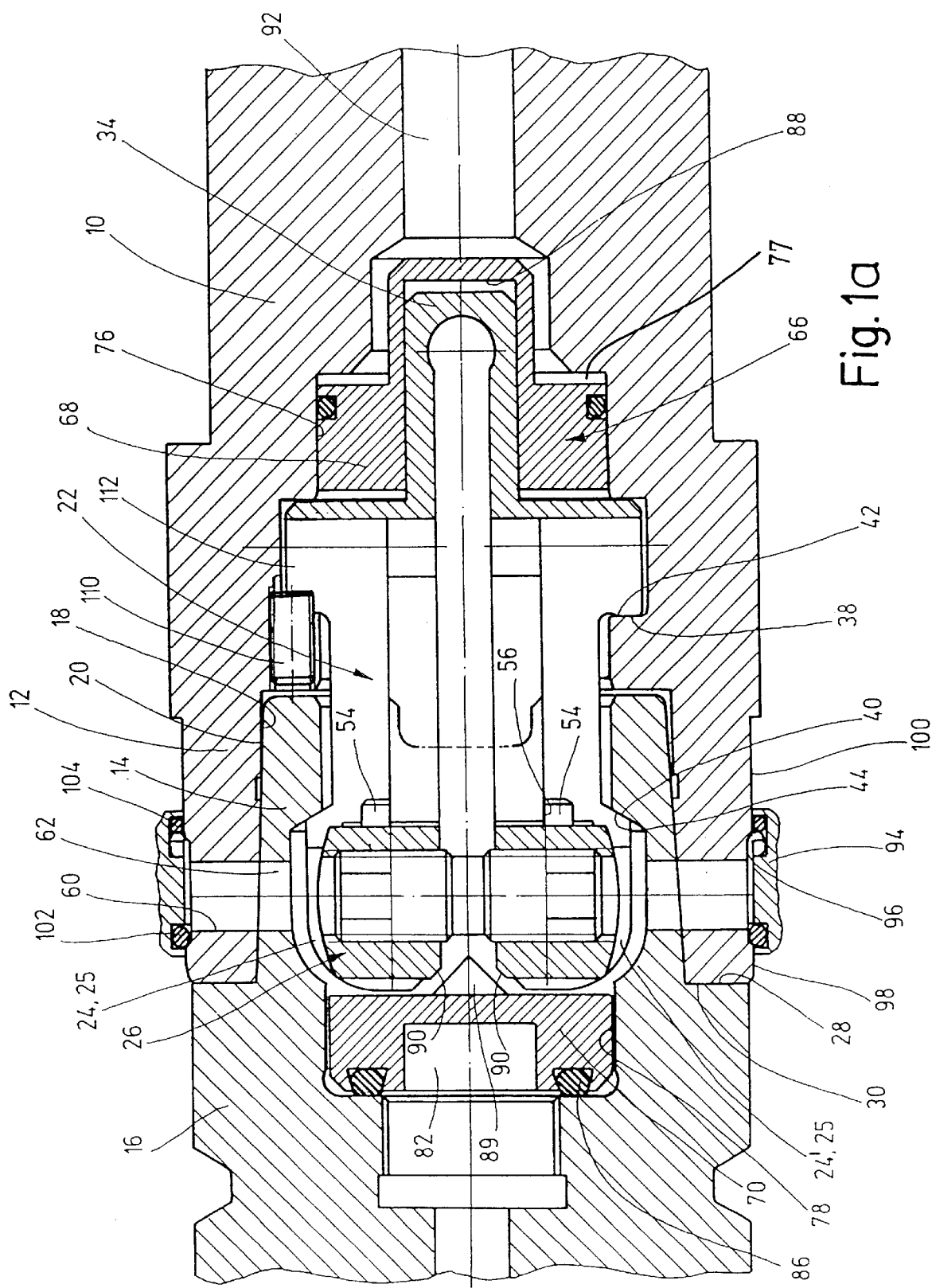

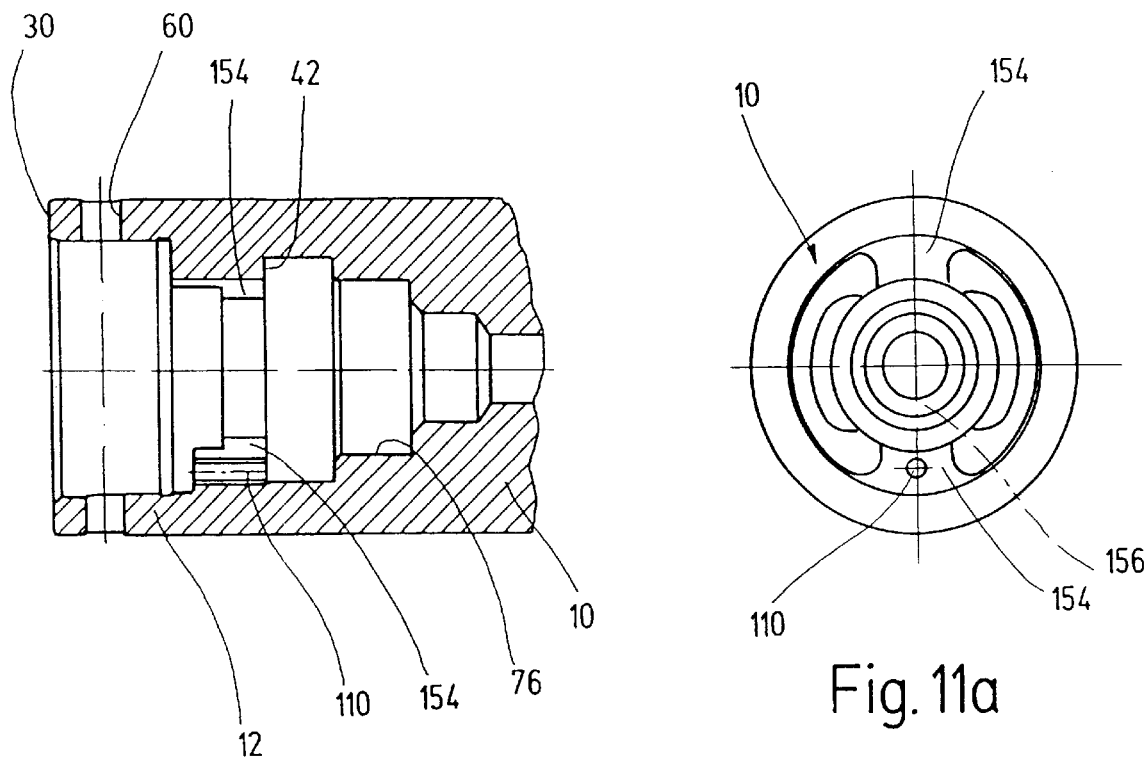
Fig. 11b
Fig. 11a
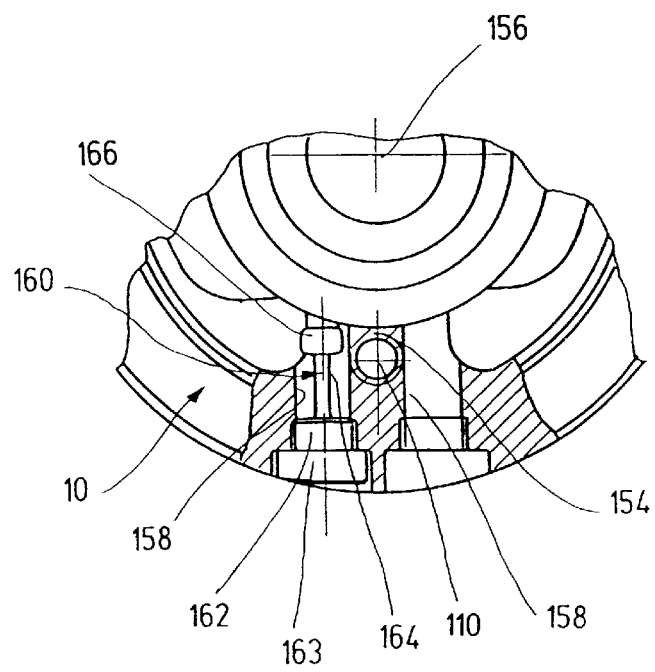
Fig. 11c

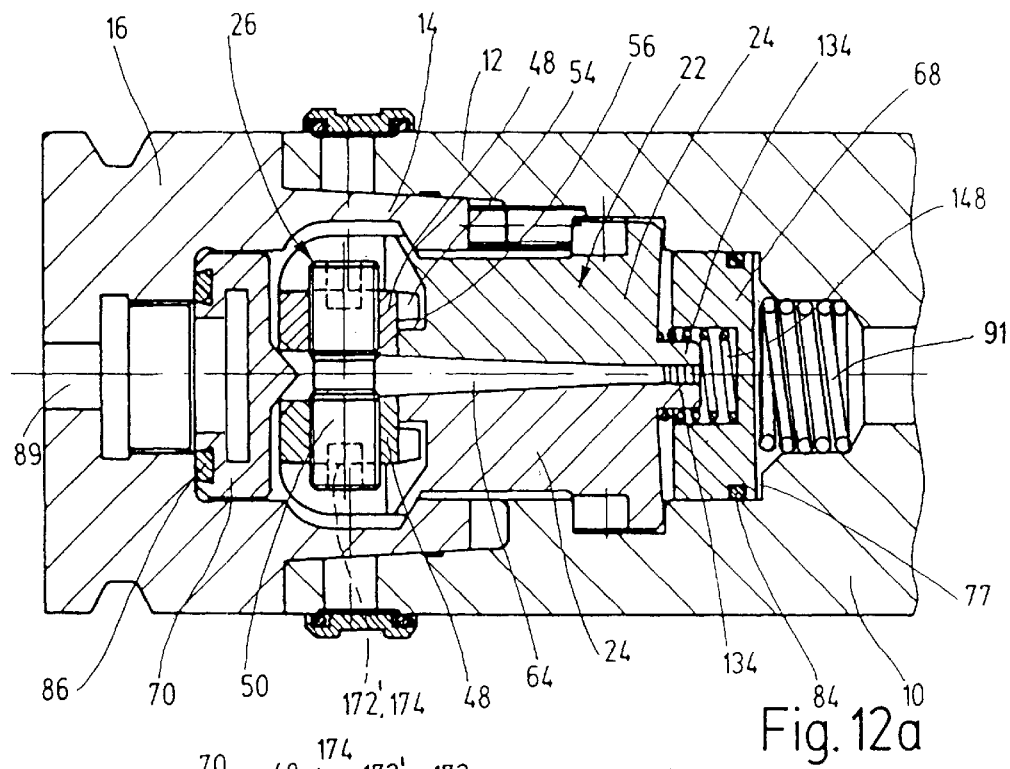
Fig. 12a
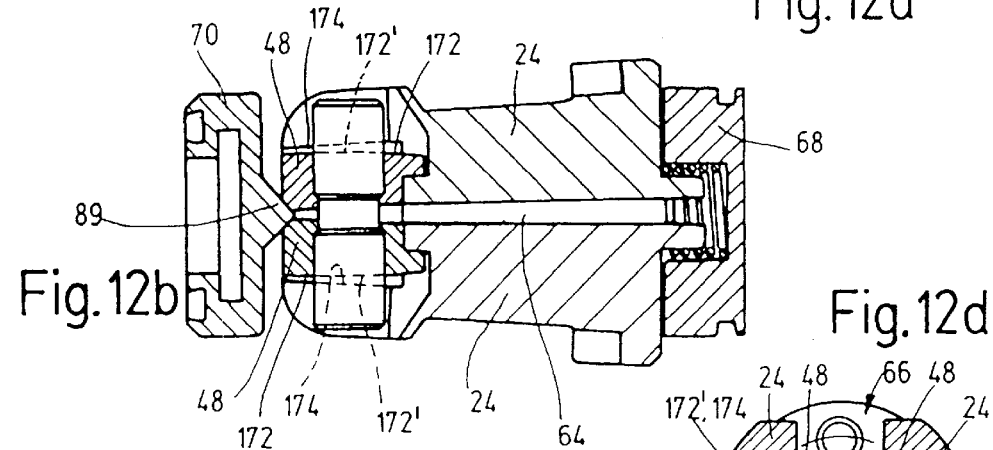
Fig. 12b
Fig. 12d
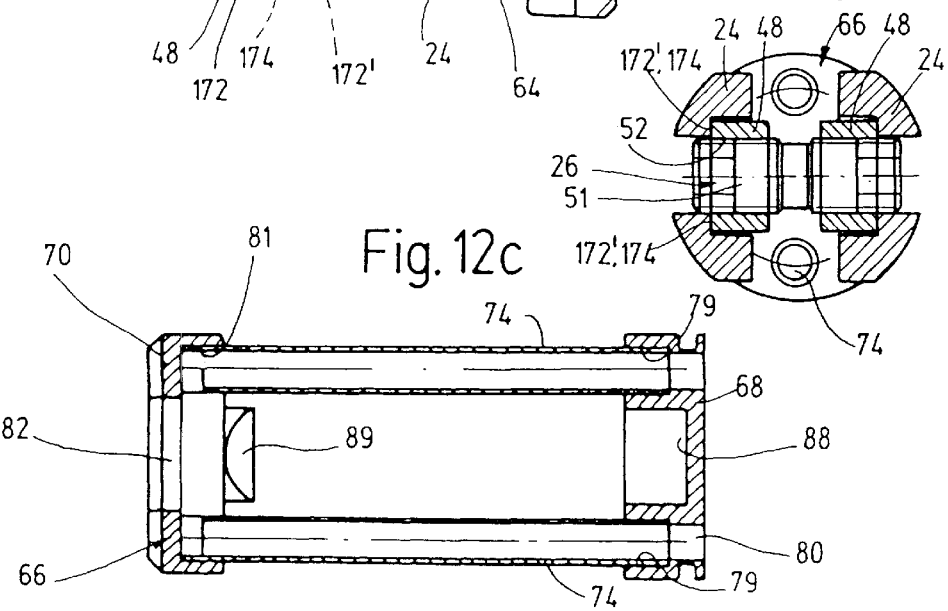
Fig. 12c

DEVICE FOR CONNECTING A TOOL HEAD TO A CLAMPING SHANK

The invention relates to a device for connecting a tool head, which has a tool shank, to a clamping shank, which has a seat for the tool shank and is preferably arranged at the end side on a machine spindle, with the aid of a clamping mechanism which has at least two clamping elements, which are arranged at an angular distance from one another and, in their clamping position, connect the tool shank and the clamping shank to one another in a force-fitting manner, and an actuating mechanism for the limited displacement of the clamping elements between a release position and a clamping position.

The clamping elements which can be adjusted using the actuating mechanism are used to generate a pressure between planar surfaces of the parts which are to be coupled to one another. In a known device of this type, the claw-like or clip-like clamping elements, at one end, are fitted into the seat of the clamping shank, while at the other end they extend into the interior of the tool shank, which is of hollow design. They can be supported, by means of in each case two clamping shoulders, which are arranged at an axial distance from one another and face toward one another, on clamping surfaces which are arranged in the interior of the clamping shank and of the hollow tool shank and face away from one another, and can be adjusted between a release position and a clamping position by means of the actuating mechanism. One frequently encountered drawback of the known device is that during the clamping operation it is necessary to overcome relatively high frictional forces and spring forces which act in the opposite direction to that of achieving a high clamping force between the parts which are to be coupled. A further drawback of the known coupling device of this type consists in the relatively complicated mechanical structure, which frequently comprises filigree individual parts, of the clamping mechanism, which particularly with small sizes leads to strength and assembly problems.

In view of the above, the invention is based on the object of developing a connecting device of the type mentioned in the introduction which is easy to produce and assemble.

The combinations of features given in patent claims 1, 33, 38, 44, 60, 75 and 82 are proposed in order to achieve this object. Advantageous configurations and refinements of the invention will emerge from the dependent claims.

To achieve this object, according to the invention, it is primarily proposed that in each case one piston-like centering element engage over the clamping insert at its end-side ends, and that the centering elements be rigidly connected to one another by means of axially parallel webs, so as to form a centering cage which engages over the clamping mechanism with axial play, and in each case engage in one axially central, preferably cylindrical recess in the region of the base of the clamping shank and the tool shank, which is preferably designed as a hollow shank, leaving clear an axial space.

The centering cage is expediently designed as an ejector element which, under the action of the actuating mechanism when the clamping mechanism is being released, separates the tool shank from the clamping shank in the axial direction. In a preferred configuration of the invention, a fluid pressure can be applied to the centering cage at its centering element on the clamping shank side, via the free space, in the direction of the hollow shank. The webs may be of hollow design, so as to form in each case one coolant pipe, while the piston-like centering elements have inlet openings and outlet openings which are in communication with the coolant pipes. The clamping mechanism with the actuating mechanism, on the one hand, and the centering cage, which is designed as a coolant bridge, on the other hand, in the assembled state form a structural unit which during assembly can be fitted into the clamping shank by one simple action, and can be locked therein, for example by means of the locking bolt.

Advantageously, the centering element on the clamping shank side has at least one inlet opening which is oriented in an axially parallel direction and can be sealed by means of a radial seal inside the associated recess. To avoid baffle surfaces in the feed line, which could cause the coolant fluid to become segregated, it is advantageous if at least one inlet opening is connected to a central passage on the clamping shank side via an inclined, edgeless inlet passage. Such an arrangement is advantageous in particular for minimal-quantity lubrication, in which a carrier gas laden with oil particles (an aerosol) is used as the coolant fluid instead of a liquid coolant.

The centering element on the hollow shank side advantageously has a central outlet opening which is preferably in communication with the coolant pipes via inclined, edgeless outlet passages, and can be sealed inside the associated recess by a seal which surrounds the outlet opening on the outside. To prevent depositions and pressure drops in the flowing cooling fluid when minimal-quantity lubrication is used, it is proposed, according to a preferred configuration of the invention, for the central passage on the clamping shank side, the inlet passages, the coolant pipes, the outlet passages and the central outlet opening to have a cross section of flow which is substantially constant or, in sections, increases or decreases continuously.

According to a preferred configuration of the invention, the seal on the hollow shank side is designed as an axial seal. This arrangement has the advantage that the seal cannot be damaged during a tool change. It is also possible to provide a lip seal at that location, the sealing lip of which can be pressed against a base surface or a lateral surface of the recess on the hollow shank side under the action of the coolant pressure. If pressure is therefore applied to the tool head by means of coolant via a passage on the clamping shank side after the coupling operation, the centering cage is displaced, under the action of the coolant, toward the tool head, so that the centering element on the hollow shank side comes into contact with its seal. A further improvement in this respect is achieved by the fact that a spring member which presses the centering cage gently toward the tool head is arranged between the clamping shank and the centering cage. The spring member may in this case be designed as a helical compression spring which is arranged in a cylindrical recess in the clamping shank and is gently preloaded between the clamping shank and the centering element on the clamping shank side. The gentle preloading is to be selected in such a way that the centering cage is reliably displaced toward the tool head while, nevertheless, it does not present any significant resistance during the clamping operation.

The centering element on the clamping shank side may have an axially central pocket for holding ends, on the clamping shank side, of the clamping elements, which ends project axially beyond the clamping insert in such a manner that they float in the axial and radial directions.

A significant advantage of the clamping insert with split clamping elements consists in the greater ease of assembly and dismantling with a prefabricated centering cage. The clamping elements are expediently fitted releasably into the prefabricated centering cage.

To make it easier to introduce the hollow shank into the hollow-shank seat of the clamping shank, it is proposed, according to a preferred configuration of the invention, for a spring element which preloads the centering cage in the direction of the clamping shank to be arranged between the clamping insert and the centering cage. The spring force of the spring element is to be selected in such a way that the forces acting on the centering cage under the action of the coolant pressure are able to overcome the spring force. The spring element may at the same time be designed as a centering member for the clamping insert. In particular, the spring element may be designed as a helical compression spring, one end of which engages in pitch-circle recesses, which are open toward the clamping shank side, in the clamping elements, and the other end of which is supported on the centering element on the clamping shank side. To achieve a balance, it is advantageous if the clamping elements of the clamping insert are pressed radially outward or inward via the spring element, so that they are not exposed to any free play in the radial direction. This can be achieved by the fact that the clamping elements each have an inclined support shoulder, which faces inward or outward on one side, for the spring element, which is preferably designed as a helical compression spring. These measures ensure that, due to the symmetrical design, the principal axis of inertia coincides with the axis of rotation, which is advantageous in particular for high-speed machining.

Alternatively, the spring element may be designed as a compression spring, one end of which is supported on the intermediate member and the other end of which is supported on the centering element on the clamping shank side. The axially projecting ends, on the clamping shank side, of the clamping elements may form an axially central seat for an intermediate member which is designed as a roller or ball. Expediently, in the clamping position they complement one another to form a conical outer surface which tapers toward the clamping shank, and in the release position they complement one another to form a cylindrical outer surface which advantageously vertically adjoins the end faces, on the clamping shank side and which face radially outward, of the clamping elements.

A further aspect according to the invention consists in the fact that, by means of an additional spring force which acts on the clamping elements in the clamping direction of the actuating mechanism, it is possible to achieve a high clamping force even with relatively low forces acting on the actuating element. Advantageously, in this case the clamping elements, in their release position, are preloaded in the clamping direction under the action of the spring force. The spring force may decrease in the clamping direction, so that the clamping elements, in their clamping position, are substantially free of preloading with respect to the spring force. As a result, in the clamping position of the clamping elements, it is also possible to minimize the frictional forces inside the clamping mechanism and the actuating mechanism, which otherwise counteract the clamping force.

In a preferred configuration of the invention, two clamping elements, which lie opposite one another in the clamping direction, are connected to one another, preferably integrally, via a spring element which, in the release position of the actuating mechanism, is preloaded in the clamping direction the spring element advantageously being completely or virtually stress-free in the clamping position of the actuating mechanism.

In a further preferred or alternative configuration of the invention, two clamping elements or clamping-element pairs, which lie radially opposite one another, are integrally connected to one another, at their end on the clamping shank side, via a flexural joint, so as to form a single-piece clamping insert, and can be radially bent with respect to one another about the bending axis of the flexural joint by means of the actuating mechanism. In this arrangement, the flexural joint of the clamping insert is advantageously in the form of a U-shaped spring loop which projects axially beyond the ends, on the clamping shank side, of the clamping elements or the clamping-element pairs.

To enable the clamping forces to be distributed uniformly over the circumference of the hollow shank and the clamping shank, it is proposed, according to a preferred configuration of the invention, for the clamping-element pairs, at their ends on the clamping shank side, to have clamping elements which are integrally connected to one another in pairs via a second flexural joint, which is oriented transversely with respect to the first flexural joint, and can be bent with respect to one another about their bending axis with the aid of the actuating mechanism. In the clamping position of the clamping elements, at least the first flexural joint is free from preloading and in the clamping position is spring-preloaded.

As an alternative, it is proposed, according to the invention, that two clamping elements or clamping-element pairs, which lie radially opposite one another, are designed as separate parts which bear directly or indirectly, via an intermediate member, against one another so as to form a clamping insert at their ends on the clamping shank side or at an axial distance therefrom, and, via the actuating mechanism, can be pivoted substantially radially with respect to one another about the tilting axis formed by the contact point.

In this case too, it is advantageous if the clamping-element pairs, at their ends on the clamping shank side, have clamping elements which are integrally connected to one another in pairs via a flexural joint, which is oriented transversely with respect to the tilting axis, and can be bent with respect to one another about their bending axis with the aid of the actuating mechanism. Advantageously, the ends, on the clamping shank side, of the clamping elements or clamping-element pairs are of convex design in the region of the contact point. The intermediate member is advantageously designed as a roller or ball which is fitted loosely between the ends on the clamping shank side. To avoid axial displacements of the clamping elements or clamping-element pairs with respect to one another, the ends on the clamping element side may be held together by means of a spring, for example by means of a spring washer or a spring clip.

In a preferred or alternative configuration of the invention, the actuating mechanism has two pressure-exerting pieces, which can be fitted into in each case one recess, which is open on the end side and radially inward, in the clamping elements or clamping-element pairs which lie radially opposite one another, and at least one screw element for adjusting the distance between the pressure-exerting pieces. The screw element may be designed as a differential screw, the threaded parts of which engage in oppositely directed screw threads, which are flush with one another and are radially oriented, of the pressure-exerting pieces.

The pressure-exerting pieces may in principle also be integrally connected to one another via a flexural joint which is preferably designed as a spring loop. In this case, the screw element is expediently designed as a threaded bolt which engages through an internal screw thread of one of the pressure-exerting pieces and the end face of which bears against an abutment of the other pressure-exerting piece.

Advantageously, a second threaded bolt, the end face of which forms the abutment for the first threaded bolt, engages through an internal screw thread of the other pressure-exerting piece.

In order, during the clamping operation, additionally to achieve a spreading action between the clamping elements of each clamping-element pair, the pressure-exerting pieces advantageously have a profile which is wedge-shaped or convex toward the adjacent clamping-element pair. To improve the spreading action, the convex or wedge-shaped profile of the pressure-exerting pieces may be divided into an in-feed slope which is relatively shallow in the in-feed direction and an adjoining relatively steep clamping slope.

According to a preferred configuration of the invention, the pressure-exerting pieces have a pressure-exerting surface which is partially cylindrical toward the adjacent clamping element and by means of which they can roll along the preferably planar stop surface of the clamping element during the clamping operation. In order to distribute the pressure over a larger surface area in the clamped state, it is advantageous if the pressure-exerting surface has a planar apex surface which adjoins the partially. cylindrical section and, in the clamped position of the pressure-exerting pieces, bears against the bearing surface with surface-to-surface contact. A further improvement in this respect is achieved by the fact that the internal screw thread of the pressure-exerting pieces and the external screw thread of the screw element have a clearance which permits tolerance compensation.

In an advantageous configuration of the invention, the clamping elements and/or the pressure-exerting pieces are surface-hardened or have a wear-resistant and/or friction-reducing surface coating, which may be formed either as a layer of hard material, for example of metal, or as a layer of soft material, for example of graphite or polytetrafluoroethylene.

The clamping elements of each clamping-element pair are advantageously separated from one another by in each case one axial gap which preferably continues all the way to the second flexural joint. This at the same time, ensures that an engagement piece which is arranged on the screw element or on the threaded spindle is radially accessible to a screwdriver through the axial gaps. To provide access f or the screwdriver to the actuating mechanism, it is additionally possible for the clamping shank and the hollow shank to have apertures which are flush with one another.

To enable the clamping elements or clamping-element pairs to be moved out of their clamping position into the preloaded release position, it is proposed, according to a preferred configuration of the invention, for the pressure-exerting pieces each to have a driver cam which bears against a radially outwardly facing stop surface of the associated clamping elements or clamping-element pairs and drives the latter with it during actuation toward the release position.

In a further advantageous configuration of the invention, the clamping surfaces on the clamping shank side and the associated clamping shoulders of the clamping elements are oriented substantially in a radial plane, while the clamping surfaces on the hollow shank side and the associated clamping shoulders of the clamping elements are designed as inclined or cone surfaces which diverge radially outward with respect to the clamping shoulders and surfaces on the clamping shank side. To achieve the most uniform possible clamping between hollow shank and clamping shank over the circumference, it is advantageous if the clamping shoulders of the clamping elements of each clamping-element pair include a central angle, with respect to the clamping shank axis, of from 30° to 120°, preferably 50° to 90°, with one another.

The clamping shoulders, on the hollow shank side, of the clamping elements are delimited in the circumferential direction by substantially radially oriented delimiting edges and in the radial direction by a delimiting edge which is oriented substantially in the circumferential direction. To avoid local pressure peaks in the area of the clamping shoulders during the clamping operation, taking into account the given dimensional tolerances, it is proposed, according to a preferred configuration of the invention, for at least one of the delimiting edges to be convexly rounded or beveled.

Particularly simple assembly of the clamping insert is achieved by the fact that the clamping insert, by way of its clamping shoulders on the clamping shank side, can be locked to the clamping shank in the manner of a bayonet closure and, in the locking position, can be secured against rotation in a form-fitting manner. To prevent rotation, the clamping insert may be fixed in its locked position by means of a locking bolt which penetrates through the clamping surface of the clamping shank in an axially parallel direction and engages in a form-fitting manner in a recess, which is open at the radial edge, in one of the clamping elements or clamping-element pairs. Optionally, the clamping insert may be fitted into the clamping shank rotated through 180° and locked therein.

According to a preferred configuration of the invention, the hollow shank has an outer surface which tapers conically toward its free end, and the clamping shank has a seat of corresponding conicity. The clamping is expediently effected by the fact that the hollow shank is delimited by an annular shoulder which, in the clamping position of the clamping elements, can be pressed against an annular planar surface of the clamping shank.

Since the conical hollow shank and the conical seat are connected to one another in a self-locking manner in the clamped state, an ejector mechanism is additionally required for a tool change. Therefore, in a preferred configuration of the invention, the pressure-exerting pieces, on their mutually facing sides, delimit a gap into which an ejector wedge, which projects on the hollow shank side, preferably at the centering element on the hollow shank side, and can be subjected to an axial force under the action of the pressure-exerting pieces, engages. Expediently, the gap edges, which face toward the ejector wedge, of the pressure-exerting piece are beveled in the shape of a wedge.

According to a further preferred or alternative configuration of the invention, there is a closure ring which engages around the clamping shank on the outside, can be sealed with respect to the clamping shank at its two edges and can be displaced in the axial direction to a limited extent with respect to the clamping shank, between a limit position in which it closes off the apertures and a limit position in which it opens the apertures. For this purpose, the clamping shank, in the region of the apertures, has an annular turned groove, which is adjoined, via in each case one annular step, by a run-up area of larger diameter toward the end side of the clamping shank and by a guide area of larger diameter toward the root of the clamping shank, while the closure ring has in each case one sealing ring which in the annular turned groove and in the guide area bears against the outer surface of the clamping shank. Advantageously, in the closed position of the closure ring, at least one of the sealing rings can be latched into an annular latching indentation in the clamping shank.

According to a further preferred or alternative configuration of the invention, the hollow shank, at its free end, has at least one groove for a driver on the clamping shank side to engage in, while the clamping shank has at least one bore, which is laterally offset with respect to an axial plane, for holding a bolt, which engages in the groove or in a recess in the hollow shank, eliminates the play of the driver in the groove in one direction of rotation of the clamping shank, and is of flexurally elastic design. The bore is advantageously designed as a threaded bore for receiving the bending bolt which has a corresponding screw thread. The bending bolt advantageously has a threaded section, a bending section and a driver section which is thickened in the manner of a hammer at the free end of the bending section. By means of the bending bolt according to the invention, the play between the groove and the driver is eliminated on one side in the direction of loading, the driver bearing against the groove flank via which the torque which results from the principle cutting force is absorbed. To enable the clamping device to be used for both anticlockwise and clockwise tools, it is advantageous if two holes, which are arranged mirror-symmetrically with respect to the axial plane, are arranged in the clamping shank for optionally holding a bending bolt.

The invention is explained in more detail below with reference to the exemplary embodiments which are diagrammatically illustrated in the drawing, in which:

FIGS. 1a to 1c show a longitudinal section through an intersection between a machine spindle and a tool head with integrated clamping mechanism, in the clamping position, with three different designs of the pressure-exerting pieces;

FIG. 7 shows a longitudinal section through a further exemplary embodiment of an intersection, in an illustration corresponding to FIG. 1a;

FIG. 8b shows an enlarged excerpt from FIG. 8a;

FIG. 9 shows a longitudinal section through a further exemplary embodiment of an intersection, in an illustration corresponding to that shown in FIG. 1a;

FIG. 10 shows a further modified exemplary embodiment of an intersection, in an illustration corresponding to that shown in FIG. 1a;

Figure 5A:
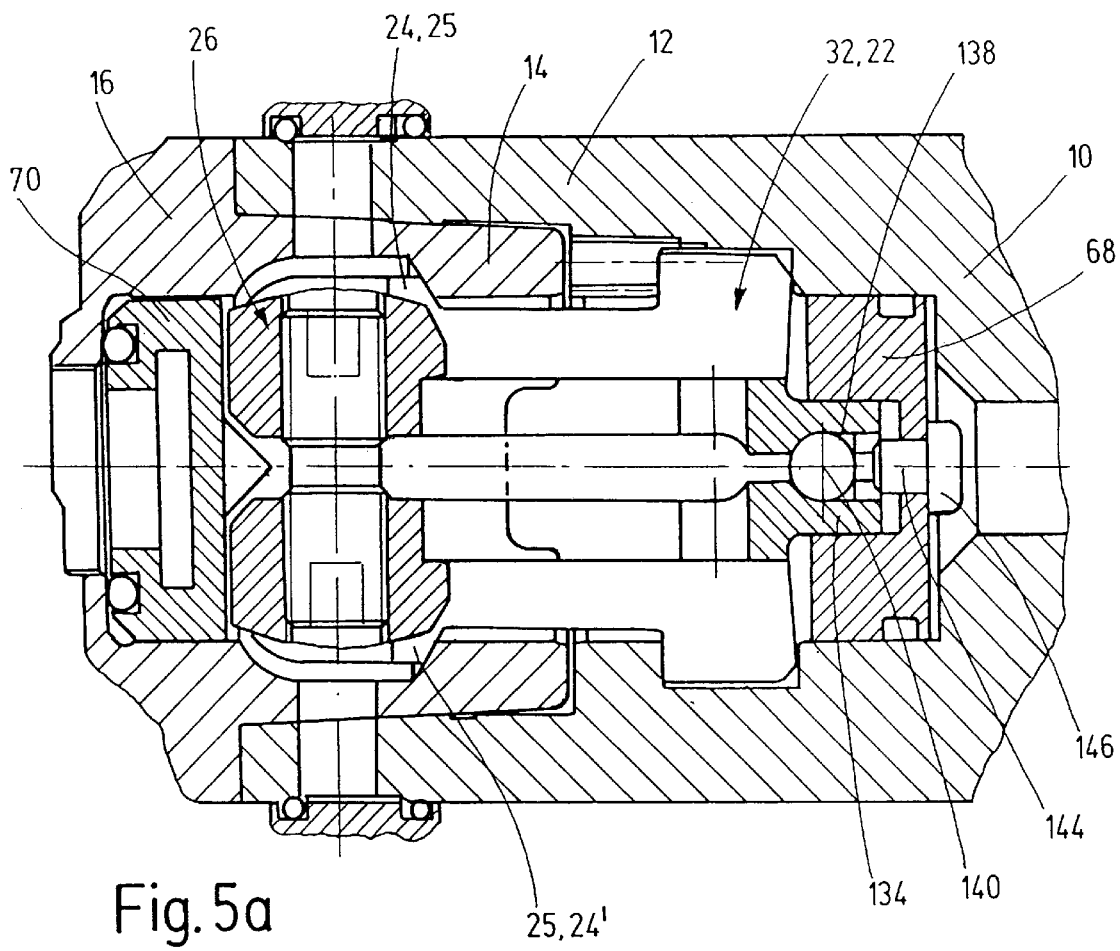
FIGS. 5a and 5b show an excerpt of a longitudinal section through an intersection in the clamping position and in the release position of the clamping insert.
Figure 5B:
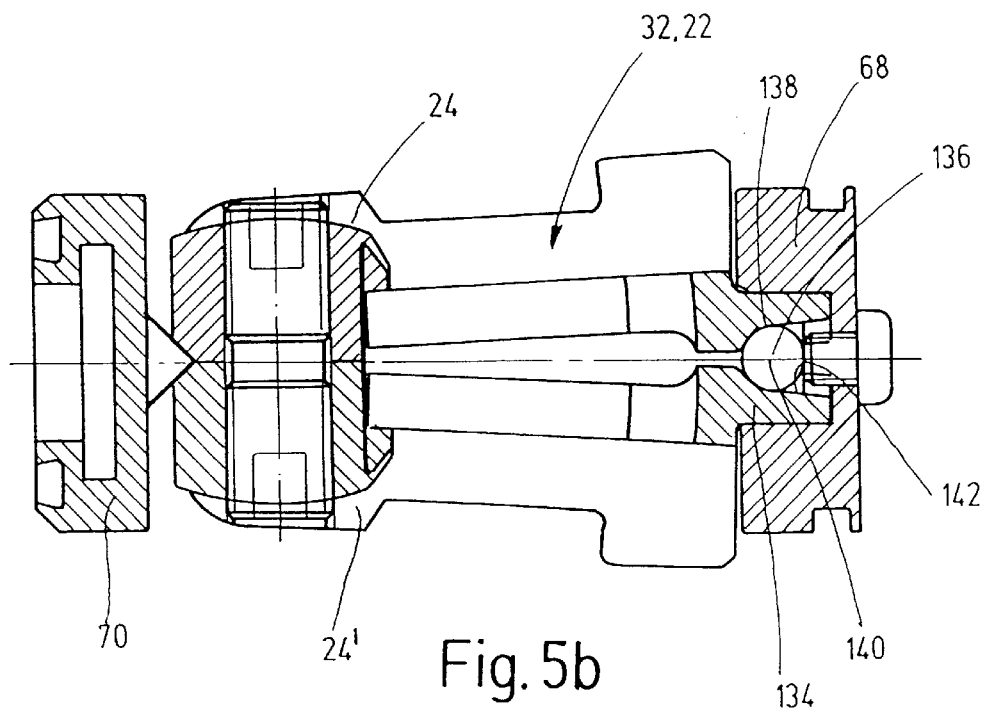
Figure 13A:
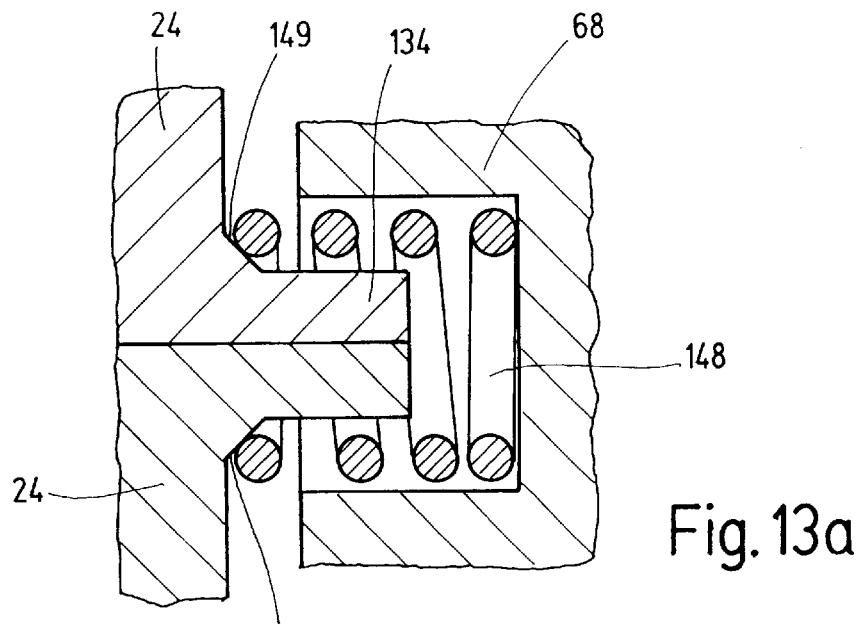
Figure 14:
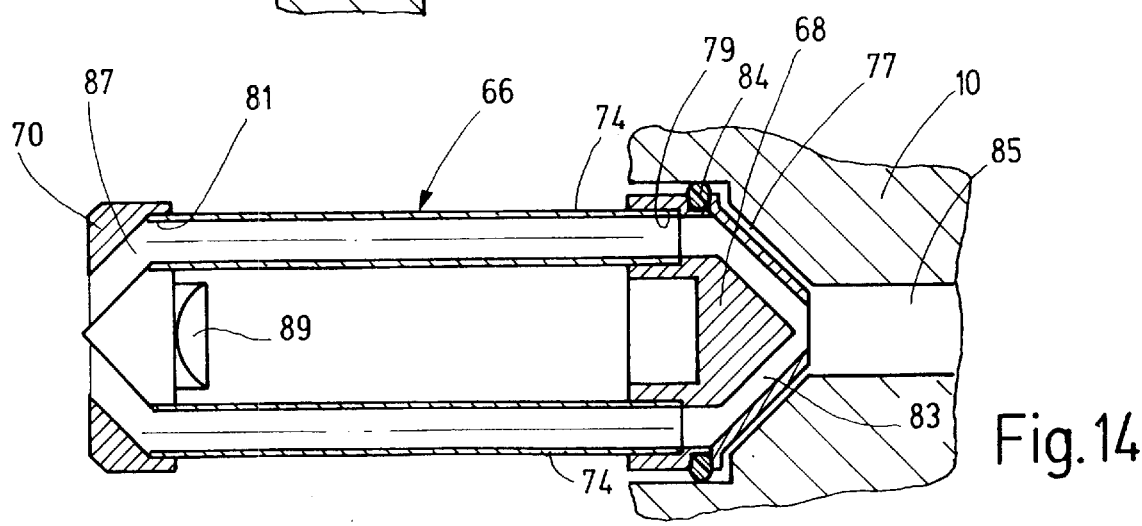

FIGS. 11a 11b and show a cross section and a longitudinal section through the clamping shank with a hollow-cone seat for an intersection in accordance with FIGS. 1 to 10;

FIG. 11c shows an enlarged excerpt from FIG. 11a, illustrating a flexurally elastic bolt;

FIGS. 12a and 12b show an illustration corresponding to FIGS. 5a and b for a modified exemplary embodiment;

FIG. 12c shows the centering cage for the clamping insert in accordance with FIGS. 12a and b;

FIG. 12d shows a section through the clamping insert in accordance with FIGS. 12a and b in the area of the actuating mechanism;

FIGS. 13a and b show an enlarged excerpt from FIG. 12b, from the area of the centering cage on the clamping shank side, with balancing at the ends, on the clamping shank side, of the clamping elements;

FIG. 14 shows a modified exemplary embodiment, compared to FIG. 12c, of the centering cage for minimal-quantity lubrication.

The intersection illustrated in FIGS. 1 to 4 essentially comprises a clamping shank 12, which is arranged at the end-side end of a machine spindle 10, a tool head 16, which has a tool shank 14, a conical seat 18, which is arranged in the clamping shank 12, for the tool shank 14, which is conical on its outer surface 20, and a clamping mechanism 22, which in the exemplary embodiment shown has two clamping-element pairs 24, 24', which are arranged at an angular distance from one another, and an actuating mechanism 26 for the limited displacement of the clamping-element pairs between a release position and a clamping position. The clamping shank 12 and/or the tool shank 14 may also be components of an adapter or an extension piece.

The primary role of the clamping mechanism 22 is to generate the pressure between the mutually facing, annular planar surfaces 28, 30 of the tool head 16 and of the clamping shank 12 in the clamped state. A further function of the clamping mechanism 22 consists in ejecting the tool head 16 from the seat 18 during the release operation, disengaging the self-locking connection between the tool shank 14 and the conical seat 18. For this purpose, the clamping mechanism has the single-piece clamping insert 32 which is shown in FIGS. 4a to d and the clamping-element pairs 24, 24' of which are connected to one another via a flexural joint 34 arranged on the clamping shank side and can be bent substantially in the radial direction with respect to one another about the bending axis of the flexural joint 34, by means of the actuating mechanism 26. The flexural joint 34 is in the form of a U-shaped spring loop which projects beyond the ends, on the clamping shank side, of the clamping elements 24, 24' in the axial direction. For their part, the clamping-element pairs 24, 24' have, at their ends on the clamping shank side, claw-like clamping elements 25 which are integrally connected to one another in pairs via a second flexural joint 36, which is oriented transversely with respect to the first flexural joint 34, and can be bent with respect to one another about their bending axis with the aid of the actuating mechanism 26.

Figure 1B:
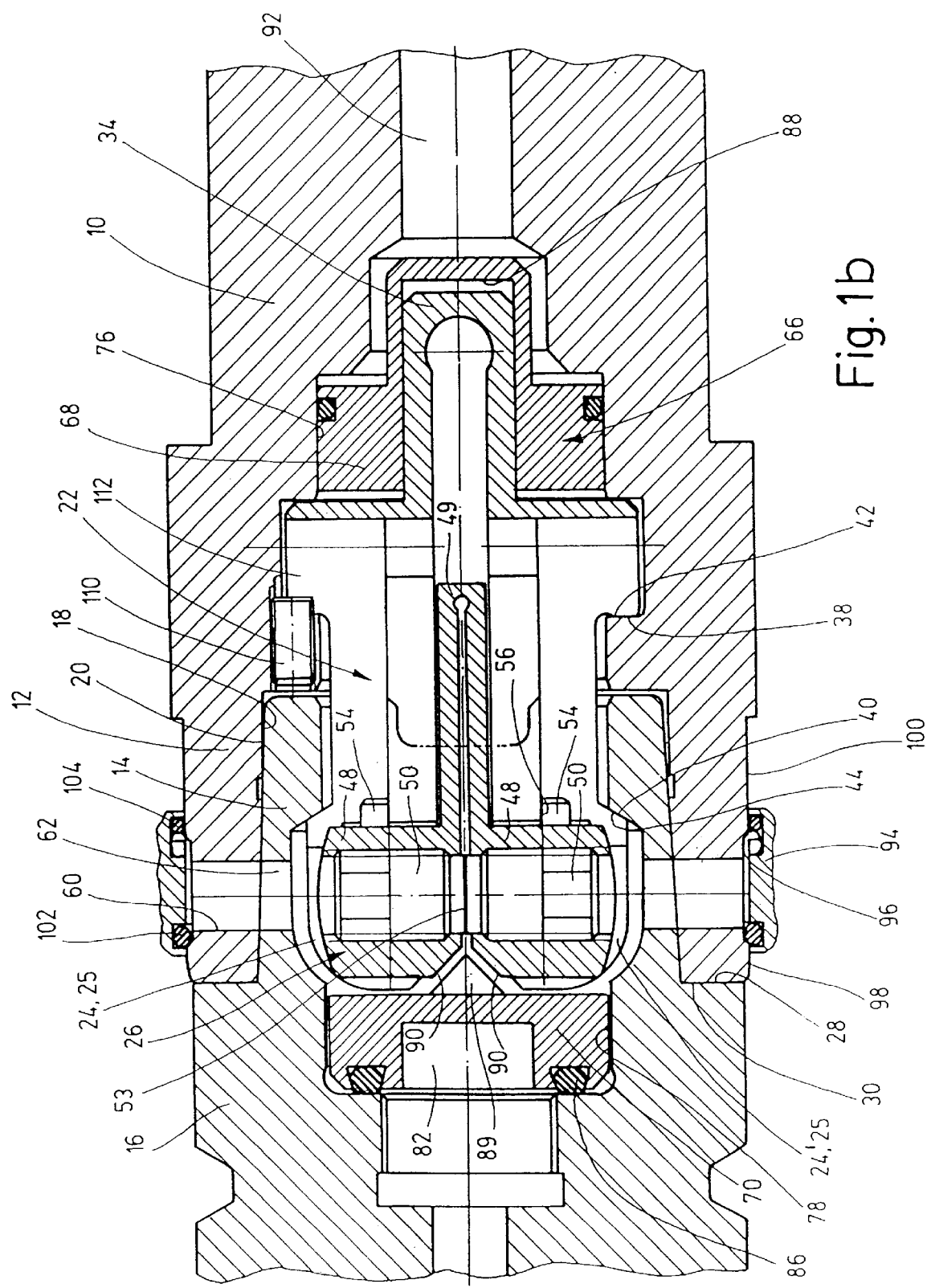
Figure 1C:
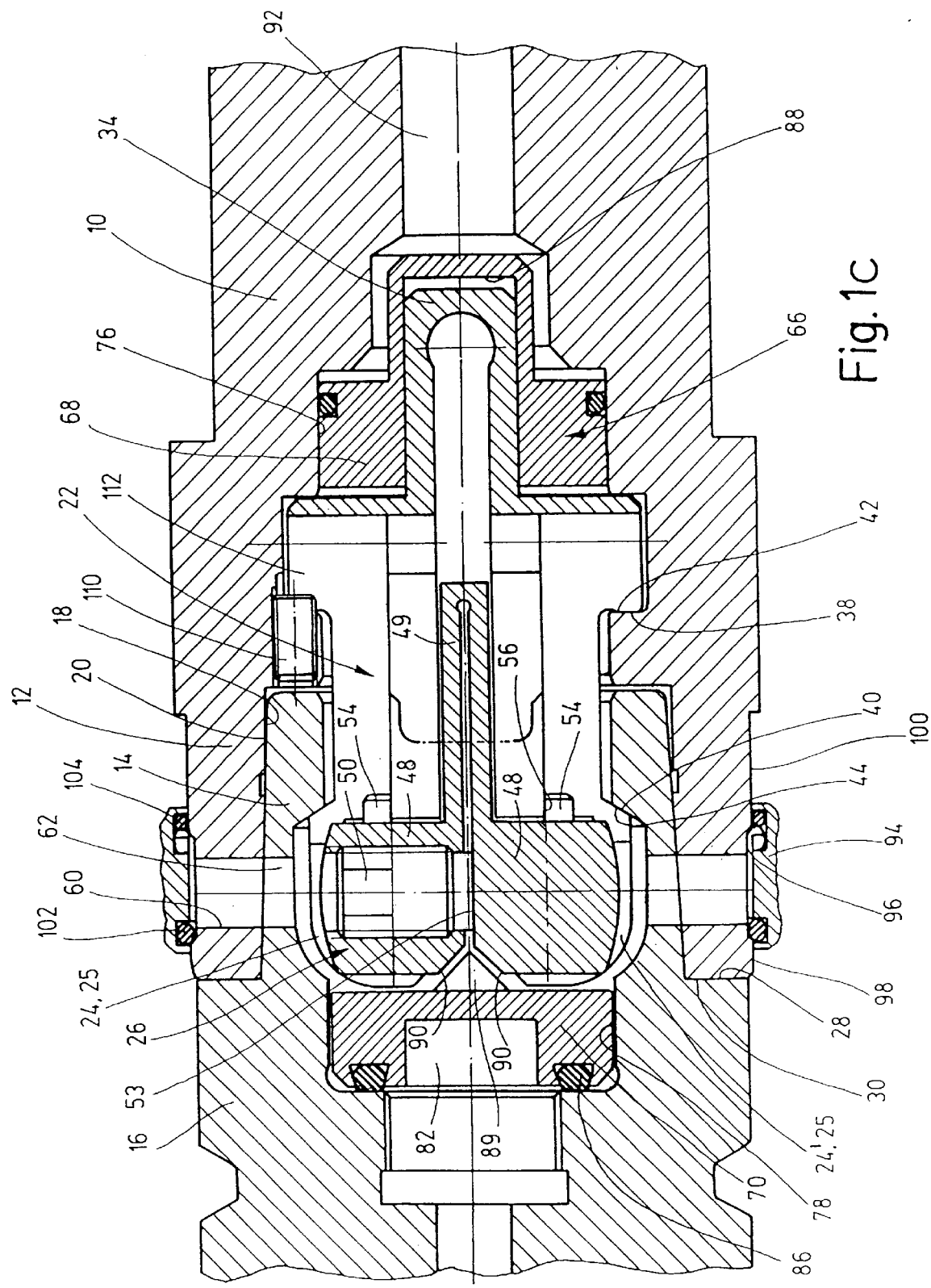
Figure 2A:
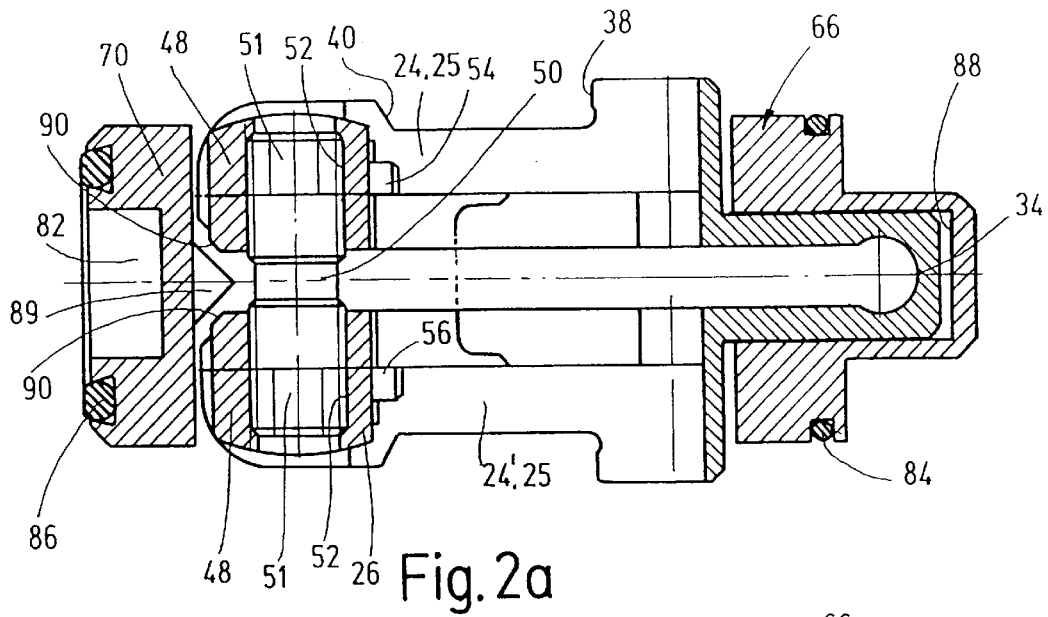
FIGS. 2a to 2d show a structural unit comprising a clamping insert, an actuating mechanism and a centering cage, in various sectional views.
Figure 2B:
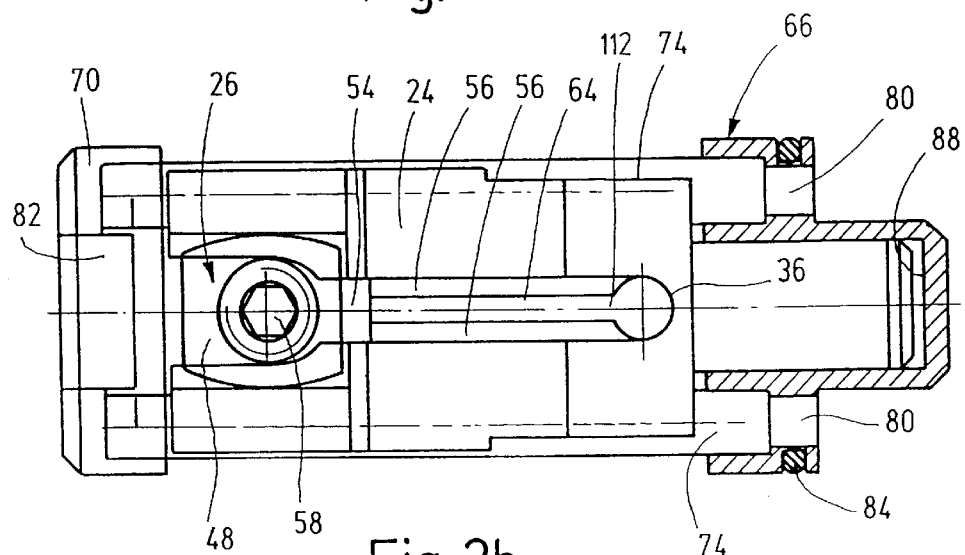
Figures 2C, 2D:
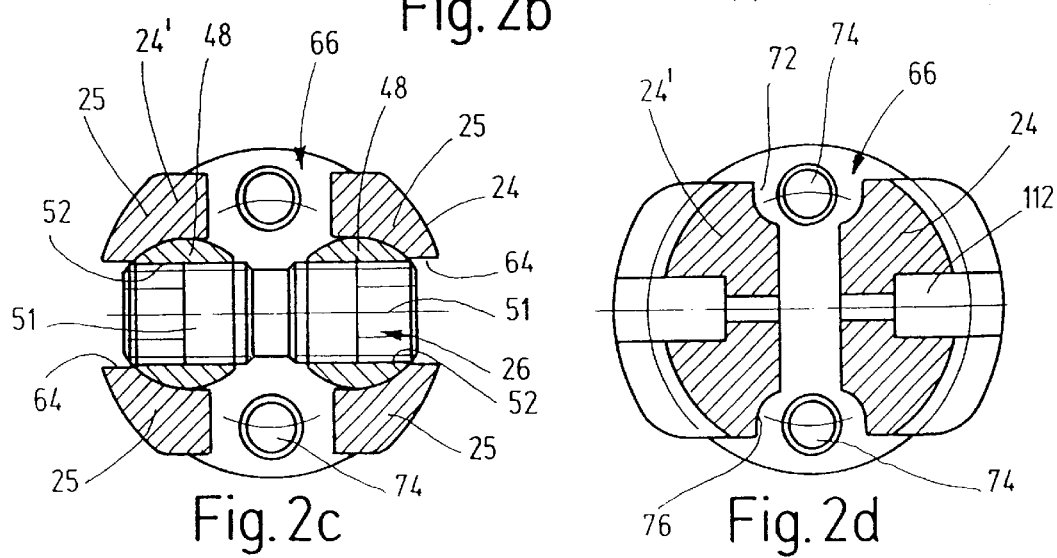
Figure 3B:
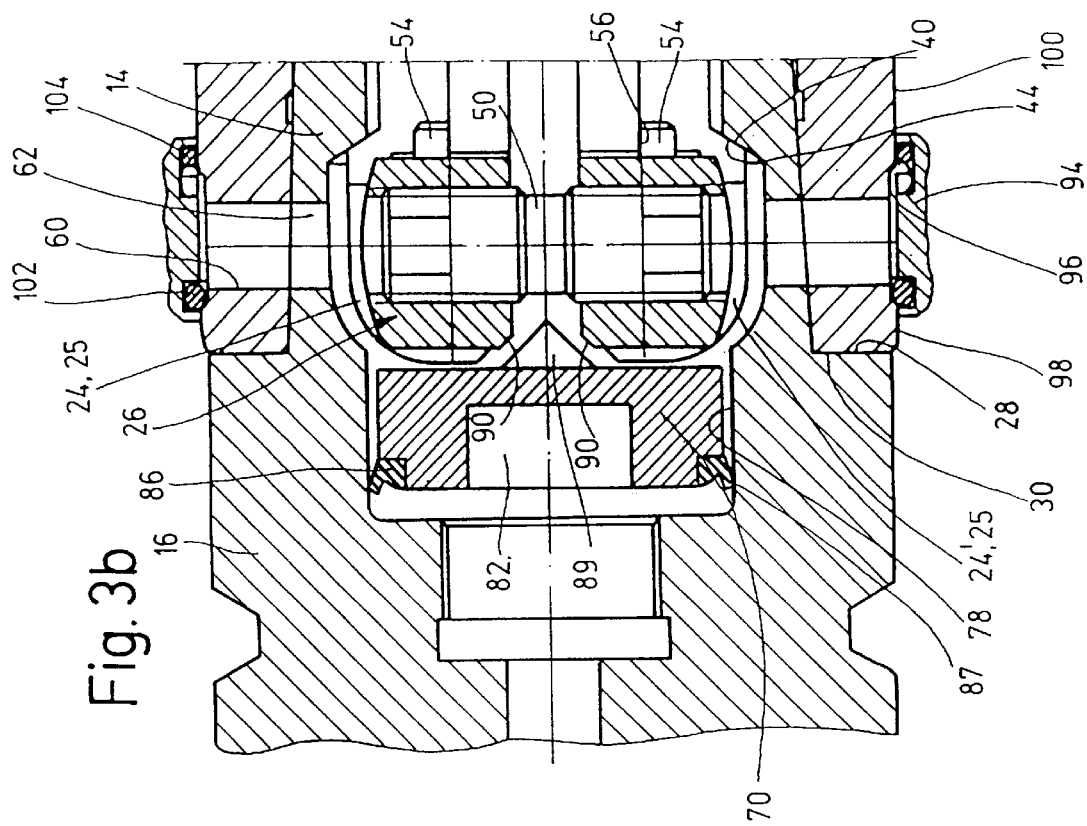
FIGS. 3a and 3b show excerpt views corresponding to FIG. 1aa, with two modified seal variants on the hollow shank side.
Figure 3A:
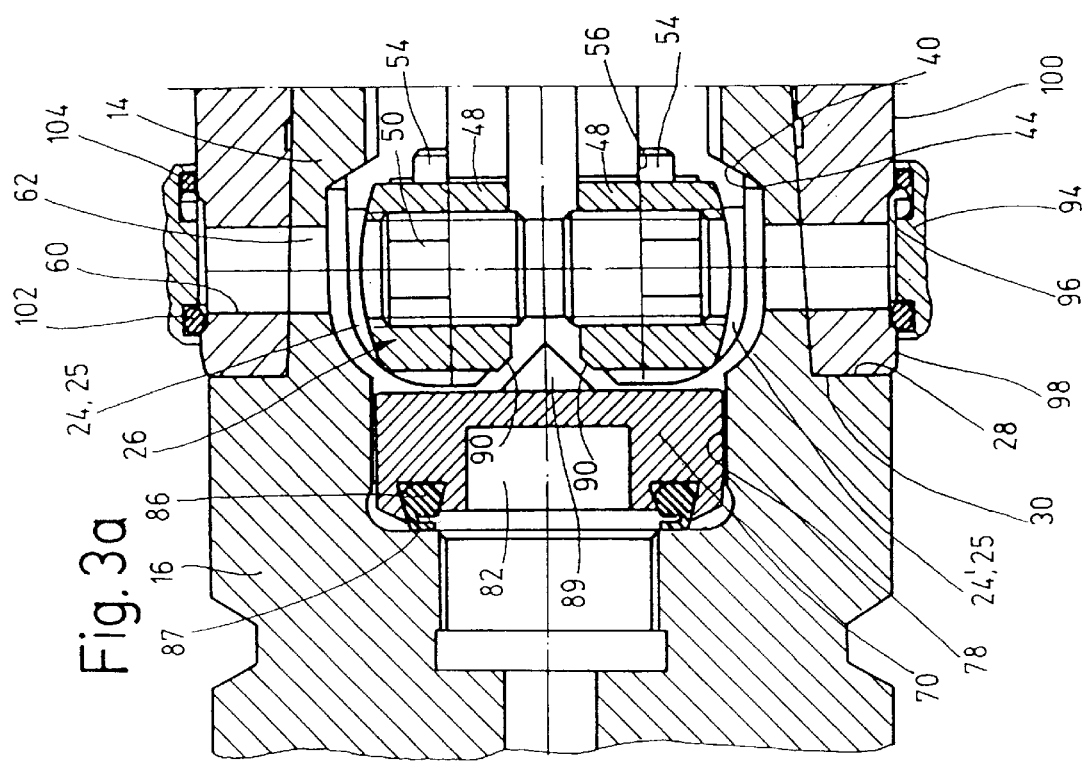

As can be seen from FIGS. 1a to c, the clamping elements 25 can be supported, by means of in each case two clamping shoulders 38, 40 which are arranged at an axial distance from one another and face toward one another, on clamping surfaces 42, 44, which are arranged in the interior of the clamping shank 12 and of the tool shank 14, which is designed as a hollow shank, and face away from one another. The clamping surfaces 42 on the clamping shank side and the associated clamping shoulders 38 of the clamping elements 25 are oriented substantially in a radial plane, while the clamping surfaces 44 on the hollow shank side and the associated clamping shoulders 40 of the clamping elements 25 are designed as conical surfaces which diverge radially outward with respect to the clamping shoulders and surfaces 38, 42 on the clamping shank side. As can be seen in particular from FIG. 4c, the clamping shoulders 40 of the clamping elements 25 of each clamping-element pair 24, 24' include a central angle $\alpha$, with respect to the clamping shank axis, of 50° to 90°. The result is a substantially uniform introduction of force over the circumference of the clamping shank 14.

Figure 4A:
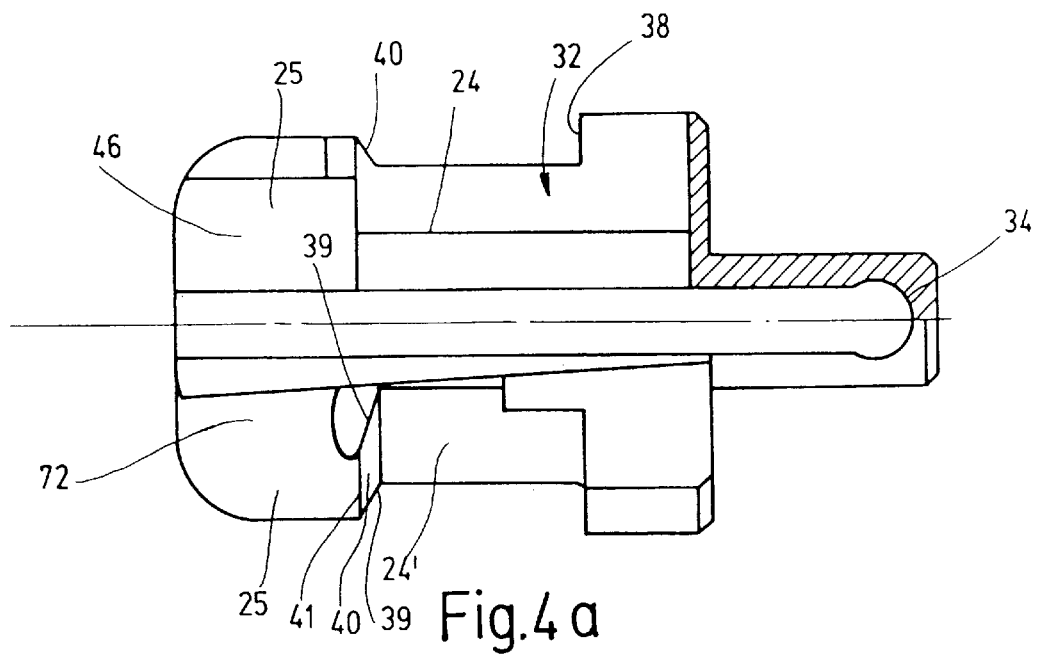
FIGS. 4a to 4d show the single-piece clamping insert without actuating mechanism, in various partial sections and views.
Figure 4B:
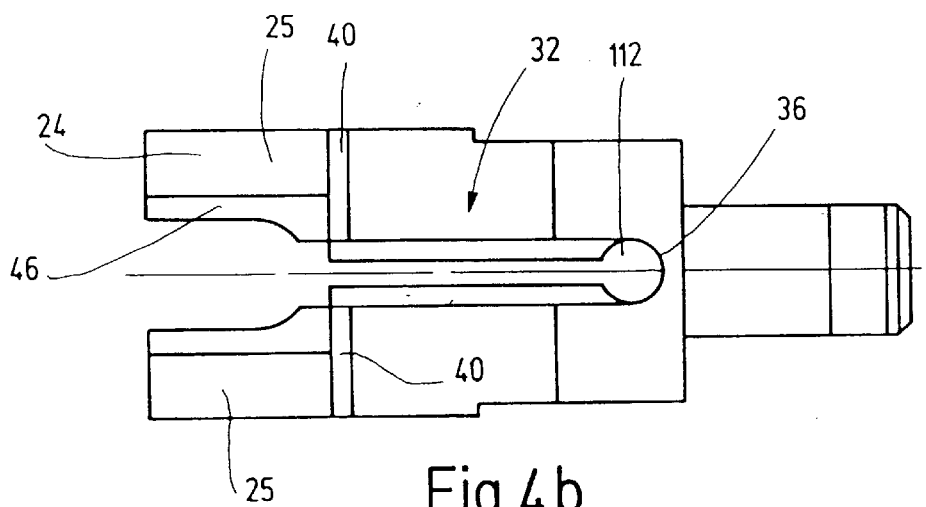
Figures 4C, 4D:
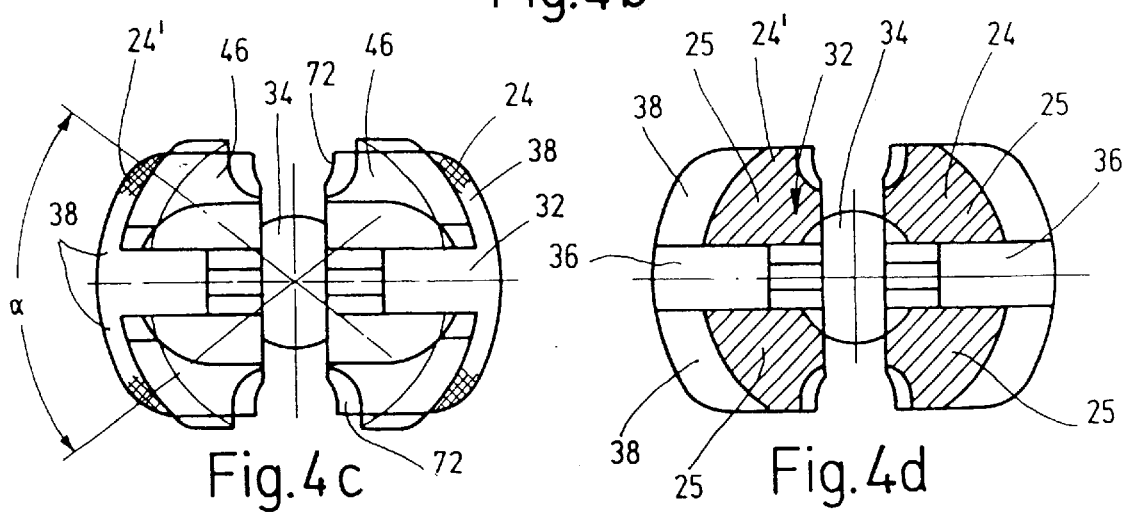

As can be seen in particular from FIG. 4a, the clamping shoulders 40, on the hollow shank side, of the clamping elements 25 are delimited in the circumferential direction by delimiting edges 39 which are substantially radially oriented and in the radial direction by a delimiting edge 41 which is oriented substantially in the circumferential direction. To avoid local pressure peaks during the clamping operation with the given dimensional tolerances, at least one of the delimiting edges 39, 41 is convexly rounded or beveled.

By means of its clamping shoulders 38 on the clamping shank side, the clamping insert 32 can be locked to the clamping surfaces 42 of the clamping shank 12 in the manner of a bayonet fitting and, in the locked position, can be secured against rotation in a form-fitting manner by means of a locking bolt 110. It can be seen from FIGS. 1a to c that the locking bolt 110 penetrates through the clamping surface 42 of the clamping shank 12 in an axially parallel direction and engages, in a form-fitting manner, in a recess 112, which is open at the radial edge, between the two clamping shoulders 38 of one of the clamping-element pairs 24, 24'.

The actuating mechanism 26 has two pressure-exerting pieces 48, which can be inserted into in each case one recess 46, which is open on the end side and radially inward, in the clamping-element pairs 24, 24' which lie radially opposite one another, and at least one screw element 50 for adjusting the distance between the pressure-exerting pieces 48. In the exemplary embodiment shown in FIG. 1a, two pressure-exerting pieces 48 which are independent of one another are provided. In this case, the screw element 50 is designed as a differential screw, the threaded parts 51 of which engage in oppositely directed internal screw threads 52, which are flush with one another and are radially oriented, of the pressure-exerting pieces 48. In the exemplary embodiments shown in FIGS. 1b and c, the pressure-exerting pieces 48 are integrally connected to one another by means of a flexural joint 49, which is designed as an axially projecting spring loop. In the case shown in FIG. 1b, two threaded bolts 50, which butt against one another at an end-side stop surface 53, are provided as the screw elements, whereas in the case shown in FIG. 1c a threaded bolt 50 penetrates through only one of the pressure-exerting pieces 48, while the other pressure-exerting piece is of solid design and has an abutment surface 53 for the threaded bolt 50.

For their part, the pressure-exerting pieces 48 have a profile which is substantially wedge-shaped or convex in the radially outward direction toward the adjacent clamping-element pair 24, 24', which profile ensures that the clamping elements 25 of the clamping-element pairs 24, 24' are spread open around the second flexural joint 36 during the clamping operation. Furthermore, a driver cam 54 is formed integrally on each of the pressure-exerting pieces 48, which cam bears against a radially outwardly facing stop surface 56 of the associated clamping-element pairs 24, 24'. Since the clamping-element pairs 24, 24' are free from preloading in the area of their flexural joint 34 in the clamping position, when the actuating mechanism 26 is actuated they are driven radially inward in the direction of the release position, generating an elastic preloading force on their stop faces 56, by the driver cams 54. To actuate the screw element 50, the latter has, on its end sides, engagement openings 58, into which an actuating spanner can be introduced from the outside through apertures 60, 62 in the clamping shank 12 and in the tool shank 14 and through the axial slots 64 which are formed between in each case two clamping elements 25 of each clamping-element pair 24, 24'.

As can be seen from FIGS. 2a to d, the clamping mechanism 22 forms a structural unit with a centering cage 66. The centering cage 66 in this case comprises two piston-like centering elements 68, 70, which engage over the end-side ends of the clamping insert 32, are rigidly connected to one another by webs, which run in axially continuous cutouts 72 in the clamping insert 32 and are designed as coolant pipes 74, and engage with axial play, leaving open an axial space 77, in each case in one axially central, cylindrical recess 76, 78 in the base area of the clamping shank 12 and of the hollow shank 14. The centering elements 68, 70 have inlet openings 80 and outlet openings 82 which are in communication with the coolant pipe 74 which engage in the receiving bores 79, 81 at their ends and are soldered or adhesively bonded therein.

In the exemplary embodiment shown in FIG. 14, the centering elements 68, 70, unlike in the other exemplary embodiments, have obliquely running inlet passages 83, via which the inlet openings 80 of the coolant pipes 74 are connected to a central passage 85 in the clamping shank. This avoids baffle edges which could lead to undesirable segregation of the coolant fluid. For the same reason, on the outlet side the outlet openings 82 are connected to the central passage 89 on the hollow shank side via inclined outlet passages 87. This design is advantageous in particular for minimal-quantity lubrication, in which an oil-containing aerosol is used as the coolant fluid.

The centering element 68 on the clamping shank side is sealed in a pressuretight manner inside the associated cylindrical recess 76 by a radial seal 84, while the centering element 70 on the hollow shank side can be sealed inside the associated cylindrical recess 78 by a seal 86 which surrounds the outlet opening 62 in the form of a ring. In the exemplary embodiment shown in FIGS. 1a to c and 2a and b, the seal 86 is designed as an axial seal. As can be seen from FIGS. 3a and b, the seal 86 may also be designed as a lip seal, the sealing lip 87 of which, under the action of the coolant pressure, can be pressed against a base-side planar surface (FIG. 3a) or against the lateral surface (FIG. 3b) of the recess 78 on the hollow shank side.

The centering element 68 on the clamping shank side additionally has an axially central pocket 88 for holding the spring loop, which projects beyond the clamping insert 32 and forms the flexural joint 34, in such a manner that it floats in the axial and radial directions. As a result, the centering cage 66 can be displaced in the axial direction with respect to the clamping insert 62. This possibility of displacement can be utilized to eject the tool head 16 during the release operation if the pressure-exerting pieces 48, on their mutually facing sides, delimit a gap in which an ejector wedge 89, which projects on the centering element 70 on the hollow shank side, engages. During the release operation, the centering cage 66 is subjected to an axial force via the ejector wedge 89 under the action of the pressure-exerting pieces 48, which axial force, due to the displaceability of the centering cage 66, leads to the tool head 16 being ejected. To improve the transmission of force, the gap edges 90, which face toward the ejector wedge 89, of the pressure-exerting pieces are beveled in the shape of a wedge. Due to its piston action in the cylindrical recess 76, the centering element 68 on the clamping shank side also ensures that the centering cage 66, when pressure is applied via the coolant feed line 92, is displaced toward the tool head 16, so that the area of the gap between the centering element 70 and the cylindrical recess 78 is sealed by means of the seal 86, so that it is impossible for any liquid to escape. A further improvement in this respect can be achieved by the fact that a spring member 91, which is designed as a helical compression spring and is gently preloaded between the clamping shank 10 and the centering element 68 on the clamping shank side, is arranged in the cylindrical recess 76 in the clamping shank, so that the centering cage 66 is pressed gently toward the tool head (FIG. 12*a*).

On the outside, a closure ring 94, which can be displaced to a limited extent in the axial direction with respect to the clamping shank 12, between a limit position in which it closes off the apertures 60 and a limit position in which it opens the apertures 60, engages around the clamping shank 12. For this purpose, the clamping shank has, in the area of the apertures 60, a turned annular groove 96, which is adjoined, in each case via an annular step, toward the end side of the clamping shank 12 by a run-up area 98 of larger diameter and toward the root of the clamping shank 12 by a guide area 100 of larger diameter. The closure ring 94 has in each case one sealing ring 102, 104 in the turned annular groove 96 and in the guide area 100, bearing against the outer surface of the clamping shank; in the closed position of the closure ring 94 which is shown in FIG. 1, one of the sealing rings 102, 104 can be latched into an annular latching indentation (not shown) in the clamping shank.

Figure 6:
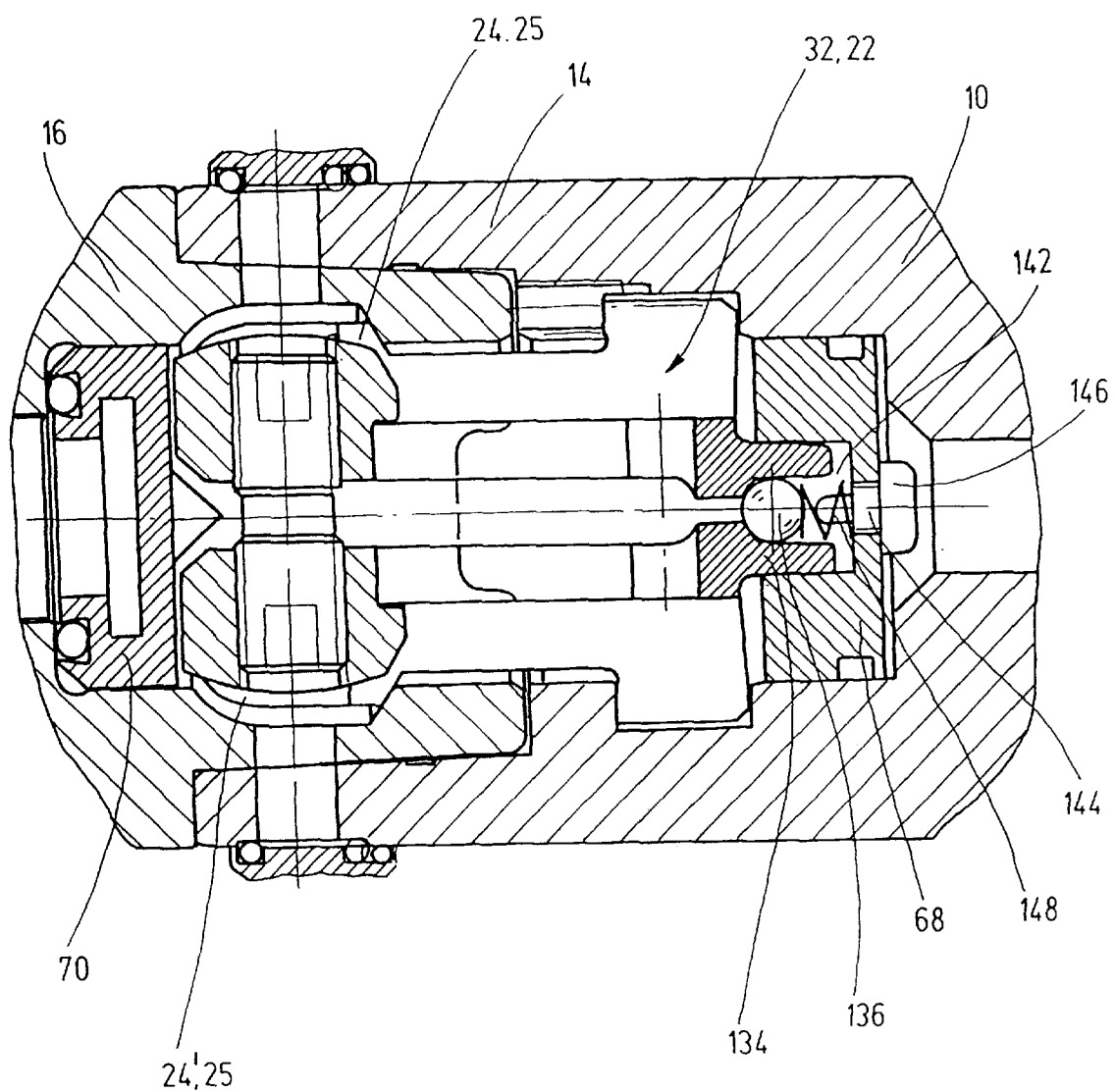
FIG. 6 shows an illustration corresponding to FIG. 5a for a modified exemplary embodiment.
Figure 7:
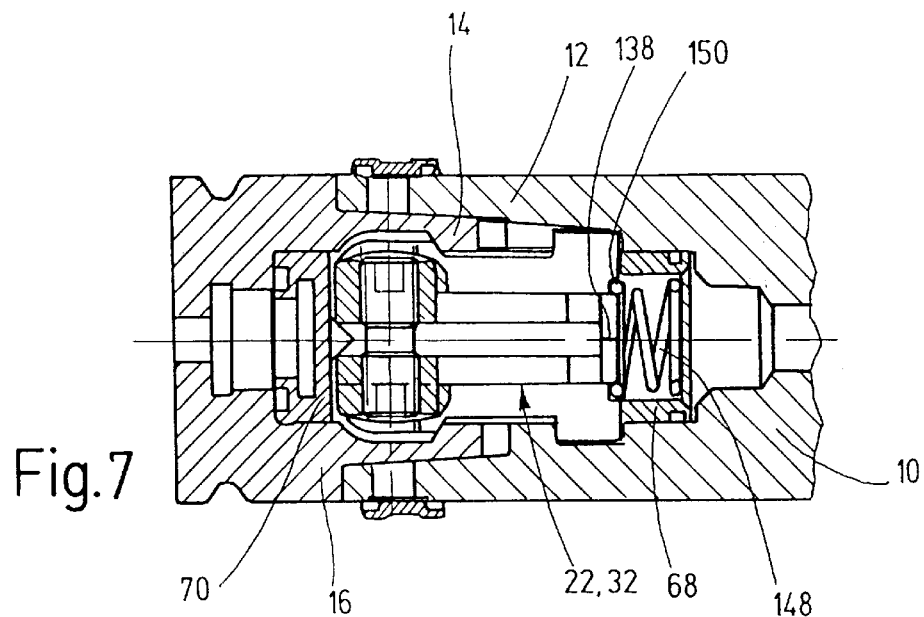
Figure 8A:
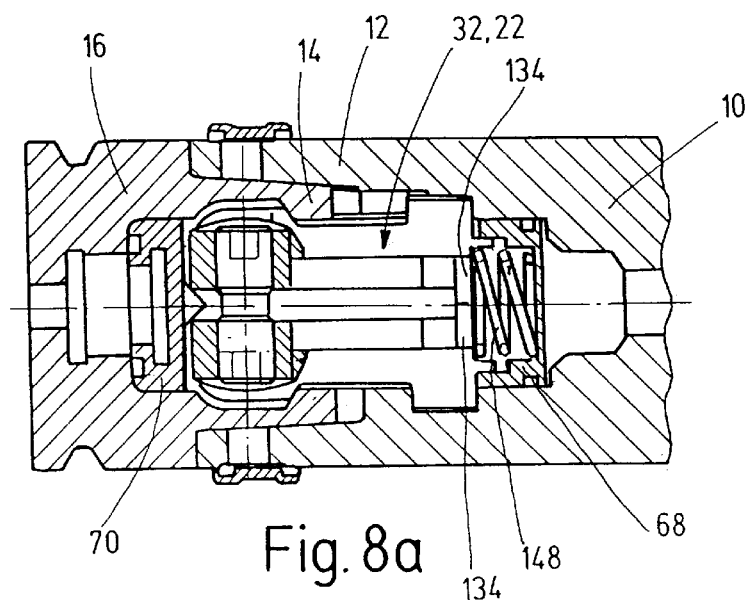
FIG. 8a shows a modified exemplary embodiment, compared to FIG. 7, of an intersection.
Figure 8B:
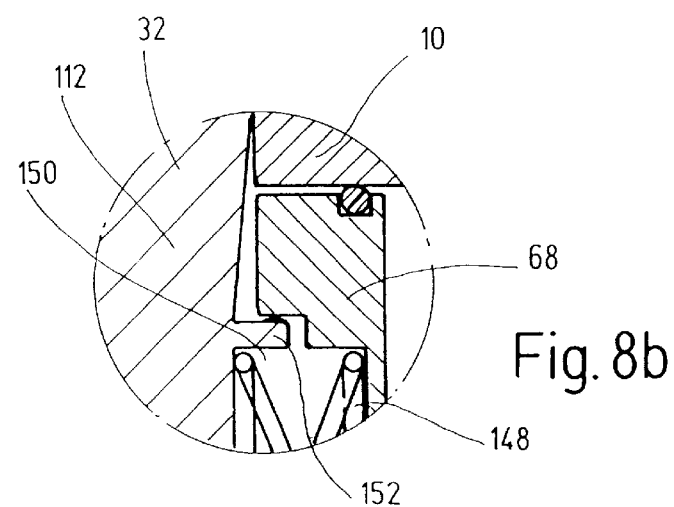
Figure 13B:
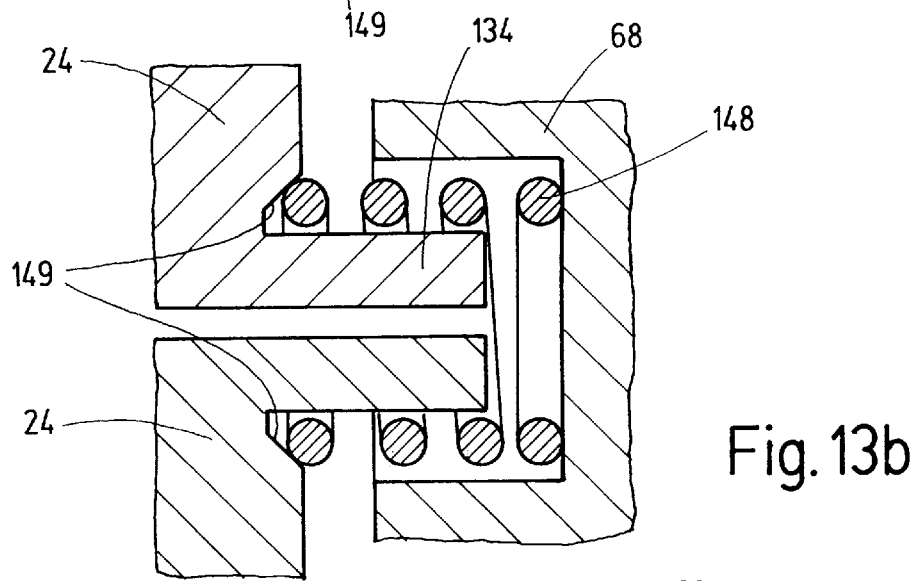

The exemplary embodiments shown in FIGS. 5 to 10 and 12 differ from the exemplary embodiments shown in FIGS. 1 to 4 by the fact that the intersections in question have a clamping insert 32 which comprises two separate clamping elements or clamping-element pairs 24, 24'. At their ends 134 on the clamping shank side, the clamping elements or clamping-element pairs 24, 24' bear either directly (FIG. 10) or indirectly (FIGS. 5 to 9) via an intermediate member 136, which is in the form of a roller or a ball, against one another in such a way that they can be pivoted with respect to one another about a tilting axis 140 formed by the contact point 138, by means of the actuating mechanism 26. The ends 134, on the clamping shank side, of the clamping elements or clamping-element pairs 24, 24' may be of convex design on the outside and/or on the inside in the area of the contact point, so that they can roll. more easily with respect to one another or with respect to the adjacent wall on the clamping shank side. This rolling process can be improved by means of the intermediate member 136 in the form of a roller or ball. In the exemplary embodiments shown in FIGS. 5, 6 and 9, the axially projecting ends 134 on the clamping shank side form an axially central seat 142 for the intermediate element which is in the form of a roller or ball, and in addition, in the exemplary embodiments shown in FIGS. 5 and 6, a screw element 146 is provided, the shank 144 of which engages in the seat 142 through a central threaded bore in the centering element 68 on the clamping shank side, and which limits the axial displacement of the centering cage 66 relative to the clamping insert 32. As can be seen from FIGS. 12*a* to *d*, the tilting operation described above can also be achieved without an intermediate member and without the ends 134, on the clamping shank side, of the clamping elements 24 bearing against one another. In the exemplary embodiments shown in FIGS. 6 to 8 and 12, between the clamping element 32 and the centering cage 66 there is additionally a pre-loaded spring element 148, which forces the centering cage 66 toward the clamping shank and one end of which, in the exemplary embodiment shown in FIG. 6, is supported against the spherical intermediate member. 136 and, in the exemplary embodiments shown in FIGS. 7, 8 and 12, is supported directly against the end 134, on the clamping shank side, of the clamping insert 32, and the other end of which is supported against the centering element. In these exemplary embodiments, the spring element 148 is without exception designed as a helical compression spring. The restoring of the centering cage 66 by means of the spring element 148 facilitates introduction of the tool shank 14, which is designed as a hollow cone. The exemplary embodiments shown in FIGS. 13*a* and *b* differ from the exemplary embodiments shown in FIGS. 12*a* and *b* in that the clamping elements 24 of the clamping insert, for balancing purposes, are pressed either radially inward or radially outward by means of the helical compression spring 148. This is achieved by way of the inclined support shoulders 149 for the helical compression spring, which in the case. illustrated in FIG. 13*a* face inward and in the case illustrated in FIG. 13*b* face outward.

In the exemplary embodiments shown in FIGS. 7 and 8*a* and *b*, one end of the helical compression spring 148 engages in an axial notch 150 in the ends 134, on the clamping shank side, of the clamping elements 24, so that centering is produced even without an extension which projects beyond the end 134 on the clamping shank side. A further improvement in this respect is achieved in the exemplary embodiment shown in FIGS. 8*a* and *b*, in which a segment-like lug 152 is additionally present in the area of the ends 134, on the clamping shank side, of the clamping elements in order to center the clamping elements 24, 24' in the area of the centering element 68 on the clamping shank side.

Figure 9:
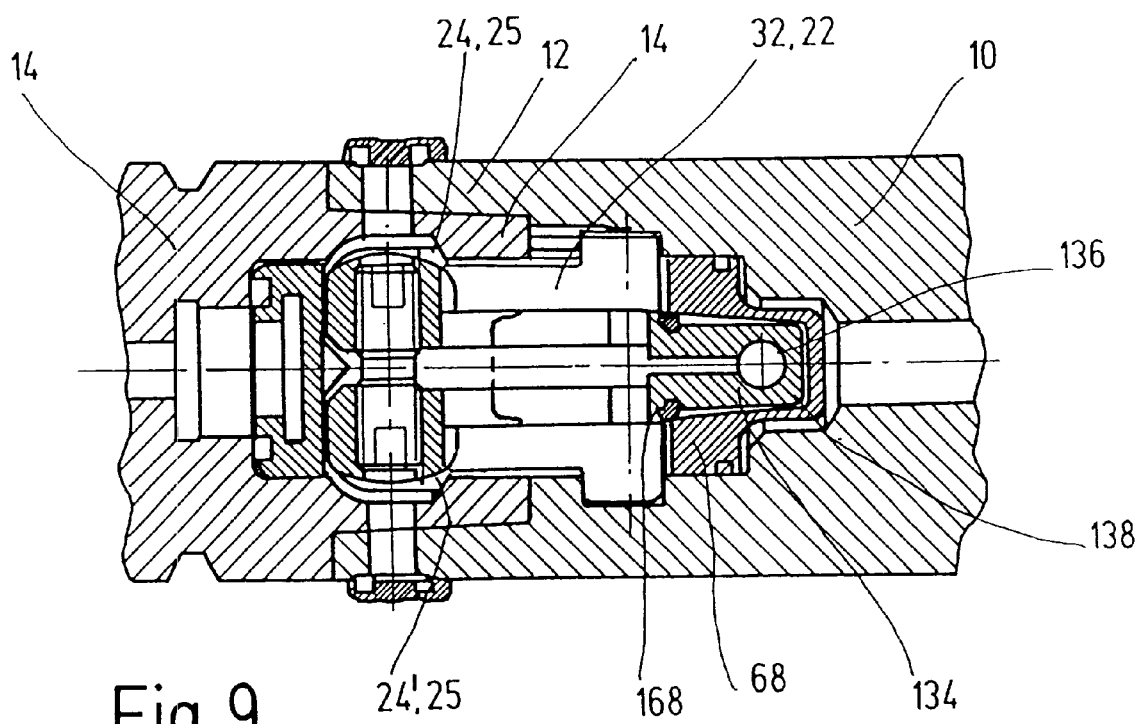

In the exemplary embodiment shown in FIG. 9, the clamping elements 24, 24' are held together in the area of the root of the ends 134 on the clamping shank side by means of a spring washer 168. In the clamping position, the ends 134 on the clamping shank side have a conical outer surface, and in the release position they have a cylindrical outer surface. The latter is also the case in the exemplary embodiment shown in FIGS. 12*a* to *c*.

Figure 10:
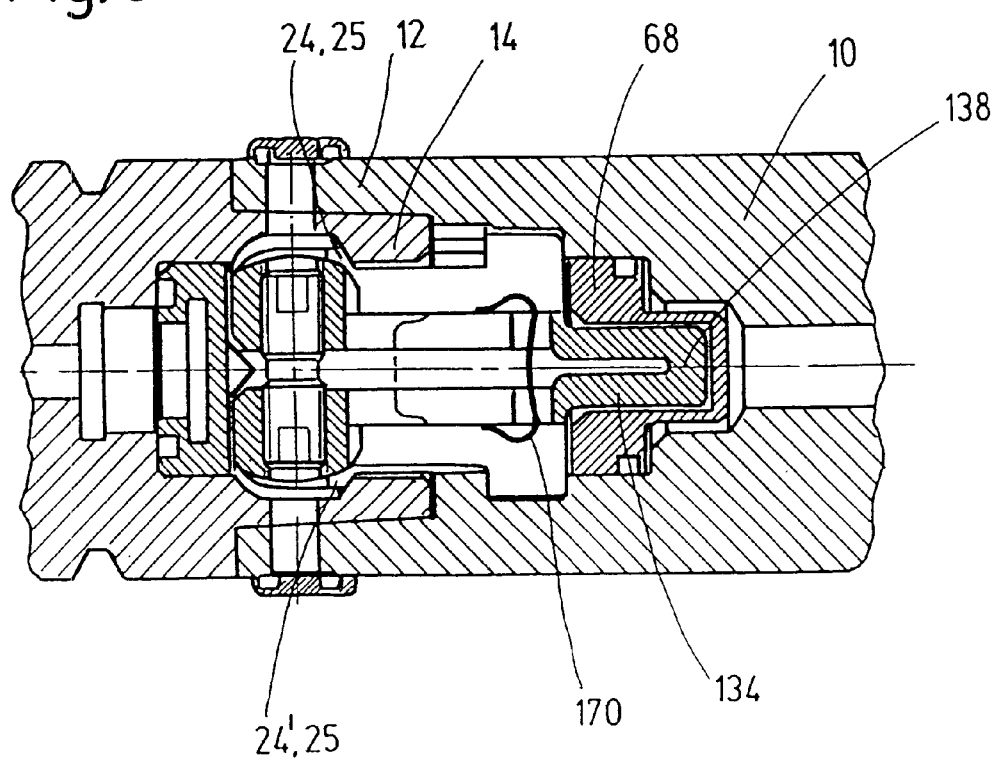

In the case shown in FIG. 10, a spring clip 170, which connects the clamping elements 24 to one another, is provided at a distance from the ends 134 on the clamping shank side.

It can be seen from FIGS. 1*a* to *c* that the clamping shank, in the bottom area of the conical seat 18, has at least one driver 154 which engages in a groove at the free end of the hollow shank, which is not shown in the corresponding figures. The driver 154 provides a form-fitting connection between the clamping shank 12 and the hollow shank 14, so that the tool which is connected to the hollow shank 14 is always in a defined orientation in the circumferential direction with respect to the clamping shank 12. In order to deliberately eliminate the play which is required to join the hollow shank 14, between the driver 154 and the groove, on one side in the direction of loading, two holes 158, which are arranged mirror-symmetrically with respect to an axial plane 156 and are parallel to the axial plane, are provided in the wall of the clamping shank 12, which holes touch the driver 154 on the inside. Depending on whether the tool rotates anticlockwise or clockwise, a bending bolt 160 is fitted into one of the two holes 158, which bolt has a threaded section 162 with a countersunk head 163, a bending section 164 and a driver section 166 which is thickened in the manner of a hammer. Under the action of a spring force generated by bending of the bending section 164, the driver section 166 presses against a flank of the groove and ensures that the play of the driver 154 in the groove on the hollow shank side is eliminated in the relevant direction of machining. To avoid the penetration of dirt and coolant leaks, in each case the second hole is closed off by means of a cap (not shown).

In the exemplary embodiment shown in FIGS. 12*a* to *d*, although the clamping elements 24 are provided with a recess 46 for holding the pressure-exerting pieces 48 at their head part on the hollow shank side, they are otherwise not divided in two. The clamping elements 24 in this case therefore do not form clamping-element pairs in the sense of FIGS. 1a to c. The clamping elements 24 are dimensioned in such a way that they can be fitted into the prefabricated centering cage and can be removed therefrom. The pressure-exerting surface 172 of the pressure-exerting pieces 48 is in this case provided with a partially cylindrical curvature, so that during the clamping operation it can roll along the adjacent stop surface 174 of the clamping element 24. In its central area, the pressure-exerting surface 172 has an apex surface 172', by means of which, in the clamped state, it bears against the planar stop surface 174 with surface-to-surface contact. To avoid jamming in this area, the internal screw threads 52 of the pressure-exerting pieces and the threaded parts 51 of the screw element 50 have a play which allows tolerance compensation. In the clamped state shown in FIG. 12a, the contact points between the pressure-exerting surface 172 and stop surface 174 are situated in the immediate vicinity of the axis of the screw element 50. The ends 134, on the clamping shank side, of the clamping elements 24 engage in the pocket 88 in the centering element 68 on the shank side, in the assembled position, and the compression spring 148 engages around them in that area.

The following can be stated in summary: The invention relates to a device for connecting a tool head 16, which has a tool shank 14, to a clamping shank 12, which has a seat for the tool shank 14, with the aid of a clamping mechanism. The clamping mechanism has at least two clamping elements 25, which are arranged at an angular distance from one another and, in their clamping position, connect the tool shank 14, which is preferably designed as a hollow shank, and the clamping shank 12 to one another in a force-fitting manner, and an actuating mechanism 26 for the limited displacement of the clamping elements 25 between a release position and a clamping position, the clamping elements being held in their clamping position under the action of the force of the actuating mechanism. A reliably functioning yet simple structure of the clamping mechanism is achieved by the fact that in each case one piston-like centering element 68, 70 engages over the clamping mechanism 22 at the end-side ends of its clamping elements 25, the centering elements 68, 70 being connected to one another by axially parallel webs 74 so as to form a centering cage 66 which engages over the clamping mechanism 22 with axial play. The centering elements 68, 70 each engage in an axially central, cylindrical recess 76, 78 in the area of the base of the clamping shank and of the hollow shank 14.

What is claimed is:

1. A device for connecting a tool head including a hollow tool shank to a clamping shank having a seat for receiving the hollow tool shank, a clamping mechanism having at least two clamping elements or clamping-element pairs arranged at an angular distance from one another and, in a clamping position, connecting the hollow tool shank and the clamping shank to one another in a force-fitting manner, and an actuating mechanism for limited displacement of the clamping elements between a release position and the clamping position, wherein a centering element engages the clamping elements of the clamping mechanism, and wherein the centering elements are rigidly connected to one another by axially parallel webs so as to form a centering cage which engages the clamping mechanism with axial play and at least one axially central recess in a region of a base of the clamping shank and in the hollow tool shank, leaving open an axial space.

2. The device as claimed in claim 1, wherein a fluid pressure can be applied to the centering cage at a clamping shank end thereof, and toward the hollow tool shank.

3. The device as claimed in claim 1, wherein the centering cage comprises an ejector element which, under action of the actuating mechanism when the clamping mechanism is released, separates the hollow tool shank from the clamping shank in an axial direction.

4. The device as claimed in claim 1, wherein the webs extend along axially continuous cutouts in the clamping elements.

5. The device as claimed in claim 1, wherein the webs comprise hollow coolant pipes, and wherein the centering elements have inlet and outlet openings in communication with the coolant pipes.

6. The device as claimed in claim 5, wherein at least one of the centering elements includes two receiving bores which are arranged offset through 180° with respect to one another, are aligned axially parallel and receive the coolant pipes, which are adhesively bonded, soldered or welded thereto.

7. The device as claimed in claim 5, wherein the centering element at a clamping shank end of the centering cage includes at least one inlet opening in communication with the coolant pipes and aligned axially therewith.

8. The device as claimed in claim 7, wherein the inlet opening connects to a central passage at the clamping shank end of the centering cage via inclined, edgeless inlet passages.

9. The device as claimed in claim 1, wherein the centering element at a clamping shank end of the centering cage is sealed by a radial seal inside the recess.

10. The device as claimed in claim 8, wherein the centering element at a hollow tool shank end of the centering cage includes a central outlet opening in communication with the coolant pipes via inclined, edgeless outlet passages.

11. The device as claimed in claim 10, wherein the central passage at the clamping shank end, the inlet passages, the coolant pipes, the outlet passages and the central outlet opening have a cross section of flow which is substantially constant or, in sections, increases or decreases continuously.

12. The device as claimed in claim 5, wherein the centering element at a hollow tool shank end of the centering cage is sealed inside the associated recess by a seal outwardly surrounding the outlet opening.

13. The device as claimed in claim 12, wherein the seal comprises an axial seal.

14. The device as claimed in claim 13, wherein the seal comprises a lip seal having a sealing lip for pressing against a base surface or a lateral surface of the recess at a hollow tool shank end of the centering cage under the action of coolant pressure.

15. The device as claimed in claim 1, the clamping mechanism including a clamping insert, wherein the clamping elements and the clamping insert are releasably fitted into the centering cage.

16. The device as claimed in claim 15, wherein a spring element which preloads the centering cage in the direction of the clamping shank is arranged between the clamping insert and the centering cage.

17. The device as claimed in claim 16, wherein the spring element centers the clamping insert.

18. The device as claimed in claim 16, wherein the spring element comprises a helical compression spring, one end of which engages in pitch-circle recesses arranged in the clamping elements and the other end of which is supported on the centering element on the clamping shank end.

19. The device as claimed in claim 16, wherein the clamping elements are pressed radially outward or inward by the spring element.

20. The device as claimed in claim 19, wherein the clamping elements each have an inclined support shoulder facing outwardly or inwardly for contacting the spring element.

21. The device as claimed in claim 16, wherein the spring element comprises a compression spring having one end supported on an intermediate member and the other end supported on the centering element located at a clamping shank end of the centering cage.

22. The device as claimed in claim 16, wherein the axially projecting ends of the clamping elements form an axially central seat for an intermediate member comprising a roller or ball.

23. The device as claimed in claim 1, wherein a spring member for pressing the centering cage toward the tool head is arranged between the clamping shank and the centering cage.

24. The device as claimed in claim 23, wherein the spring member comprises a helical compression spring preloaded between the clamping shank and the centering element at a clamping shank end of the centering cage.

25. The device as claimed in claim 1, wherein the clamping elements are maintained in the clamping position under the action of the force of the actuating mechanism, and wherein a spring force additionally is applied to the clamping elements in a clamping direction of the actuating mechanism.

26. A device for connecting a tool head having a hollow tool shank to a clamping shank having a seat for receiving the hollow tool shank, a clamping mechanism having at least two clamping elements arranged at an angular distance from one another and, in a clamping position, connecting the hollow tool shank and the clamping shank to one another in a force-fitting manner, and an actuating mechanism for limited displacement of the clamping elements between a release position and a clamping position, the clamping elements being held in the clamping position under the action of a force of the actuating mechanism, wherein a spring force additionally is applied to the clamping elements in a clamping direction of, the actuating mechanism.

27. The device as claimed in claim 26, wherein the clamping elements, in the release position, are preloaded in the clamping direction under the action of the spring force.

28. The device as claimed in claim 26, wherein the spring force decreases in the clamping direction.

29. The device as claimed in claim 28, wherein the clamping elements, in the clamping position, are substantially free of preloading by the spring force.

30. The device as claimed in claim 1, wherein the two clamping elements or clamping-element pairs, which lie opposite to one another in a clamping direction, are connected to one another by a flexural joint which, in the release position of the actuating mechanism, is preloaded in the clamping direction.

31. The device as claimed in claim 30, wherein the flexural joint is completely or virtually stress-free in the clamping position of the actuating mechanism.

32. The device as claimed in claim 1, wherein the two clamping elements or clamping-element pairs, which lie radially opposite one another are integrally connected to one another, at their end at a clamping shank end of the centering cage by a flexural joint to form a single-piece clamping insert so that the clamping elements are capable of being radially bent with respect to one another about a bending axis of the flexural joint by control of the actuating mechanism.

33. The device as claimed in claim 32, wherein the flexural joint comprises a U-shaped spring loop which projects axially beyond the ends of the clamping elements or the clamping-element pairs.

34. The device as claimed in claim 32, wherein the flexural joint comprises a first flexural joint and wherein the clamping-element pairs, at their ends at the clamping shank end comprise connected clamping elements integrally connected to one another in the pairs by a second flexural joint oriented transversely with respect to the first flexural joint and bendable with respect to one another about their bending axis with the aid of the actuating mechanism.

35. The device as claimed in claim 34, wherein, in the clamping position of the clamping elements, at least the first flexural joint is free from preloading and in the release position the first flexural joint is spring-preloaded.

36. The device as claimed in claim 1, wherein the two clamping elements or clamping-element pairs, which lie radially opposite one another, comprise separate parts which bear directly or indirectly, via an intermediate member against one another so as to form a clamping insert at their ends at a clamping shank end of the centering cage or at an axial distance therefrom, and, via the actuating mechanism, are capable of being pivoted with respect to one another about a tilting axis formed at a contact point.

37. The device as claimed in claim 36, wherein the clamping-element pairs, at their ends at the clamping shank end comprise connected clamping elements integrally connected to one another in the pairs by a flexural joint oriented transversely with respect to a tilting axis and capable of being bent about a bending axis with the aid of the actuating mechanism.

38. The device as claimed in claim 36, wherein ends of the clamping elements or clamping-element pairs on the clamping shank end of the centering cage are of convex design on at least one of an outside or an inside in a region of the contact point.

39. The device as claimed in claim 36, wherein the intermediate member comprises a roller or ball.

40. The device as claimed in claim 36, wherein the ends at the clamping shank end of the clamping elements or clamping-element pairs are held together by a spring washer or a spring clip.

41. The device as claimed in claim 1, wherein the actuating mechanism includes two pressure-exerting pieces, which each are capable of being fitted into a piece receiving recess opening at an inner surface of the hollow tool shank and radially inwardly receiving the clamping elements or clamping-element pairs that lie radially opposite one another, and receiving at least one screw element for adjusting the distance between the pressure-exerting pieces.

42. A device for connecting a tool head having a hollow tool shank to a clamping shank having a seat for receiving the hollow tool shank, a clamping mechanism having at least two claw-shaped or clip-shaped clamping elements spaced an angular distance from one another and having one end for insertion into the seat of the clamping shank and an opposing end for extending into the interior of the hollow tool shank to be clamped in place, the clamping elements being supported by two clamping shoulders arranged at an axial distance from one another and facing toward one another, on clamping surfaces arranged in the interior of the clamping shank and the hollow tool shank and facing away from one another, and an actuating mechanism for displacing the clamping elements between a release position and a clamping position, wherein the actuating mechanism includes two pressure-exerting pieces for fitting into a respective piece receiving recess, each respective recess comprising an opening in the clamping elements or clamping-element pairs which lie radially opposite one another, and at least one screw element for adjusting the distance between the pressure-exerting pieces.

43. The device as claimed in claim 42, wherein the screw element comprises a differential screw, threaded parts of which engage oppositely directed internal screw threads that are flush with one another and radially oriented in the pressure-exerting pieces.

44. The device as claimed in claim 41, wherein the pressure-exerting pieces are integrally connected to one another via a flexural joint comprising a spring loop.

45. The device as claimed in claim 41, wherein the screw element comprises a threaded bolt which engages through an internal screw thread one of the pressure-exerting pieces and the screw element having an end face that bears against an abutment of the other pressure-exerting piece.

46. The device as claimed in claim 45, wherein a second threaded bolt, the end face of which forms the abutment for the first threaded bolt, engages an internal screw thread of the other pressure-exerting piece.

47. The device as claimed in claim 41, wherein the pressure-exerting pieces have a profile that is wedge-shaped or convex toward the adjacent clamping-element pair.

48. The device as claimed in claim 47, wherein the convex or wedge-shaped profile of the pressure-exerting pieces is divided into an in-feed slope which is relatively shallow in an in-feed direction and an adjoining relatively steep clamping slope.

49. The device as claimed in claim 41, wherein the pressure-exerting pieces have a pressure-exerting surface that is partially cylindrical toward the adjacent clamping element and rolls along a bearing surface thereof during clamping operation.

50. The device as claimed in claim 49, wherein the clamping elements have a clamp bearing surface that faces the respective pressure-exerting piece and is planar, and wherein the pressure-exerting surfaces of the pressure-exerting pieces have an apex surface which, in the clamped position of the pressure-exerting pieces, bears against the bearing surface with surface-to-surface contact.

51. The device as claimed in claim 41, wherein internal screw threads of the pressure-exerting pieces and threaded parts of the screw element have a clearance which permits tolerance compensation.

52. The device as claimed in claim 41, wherein at least one of the clamping elements and the pressure-exerting pieces include at least one of a wear-resistant or friction-reducing surface coating, or are surface-hardened.

53. The device as claimed in claim 39, wherein the clamping elements or clamping-element pairs are separated from one another by at least one axial gap that extends to the second flexural joint.

54. The device as claimed in claim 53, wherein a screw element includes at least one engagement piece for a screwdriver, which is radially accessible through one of the axial gaps.

55. The device as claimed in claim 1, wherein the clamping shank and the hollow tool shank have apertures flush with one another providing access to the actuating mechanism for a screwdriver.

56. The device as claimed in claim 41, wherein the pressure-exerting pieces each have a driver cam that bears against a radially outwardly facing stop surface of the associated clamping element or clamping-element pair and drives the associated clamping element or clamping-element pair during actuation toward the release position.

57. The device as claimed in claim 36, wherein clamping shoulders of the clamping insert on the clamping shank side lock to the clamping shank in the manner of a bayonet closure and, in a locking position, are secured against rotation in a form-fitting manner.

58. A device for connecting a tool head having a hollow tool shank to a clamping shank having a seat for receiving the hollow tool shank, a clamping mechanism including at least two claw-shaped or clip-shaped clamping elements spaced an angular distance from one another and having one end for insertion into the seat of the clamping shank and an opposing end for extending into the interior of the hollow tool shank to be clamped in place, and the clamping elements being supported by two clamping shoulders thereof arranged at an axial distance from one another and facing toward one another, for contacting clamping surfaces arranged in the interior of the clamping shank and the hollow tool shank and facing away from one another, and an actuating mechanism for displacing the clamping elements between a release position and a clamping position, wherein a clamping insert on the clamping shank side is capable of being locked to the clamping shank in the manner of a bayonet closure and, in a locking position, is secured against rotation in a form-fitting manner.

59. The device as claimed in claim 58, wherein the clamping surfaces on the clamping shank side and the associated clamping shoulders of the clamping elements are oriented substantially in a radial plane.

60. The device as claimed in claim 58, wherein the clamping surfaces on a hollow tool shank side and the associated clamping shoulders of the clamping elements comprise inclined or cone surfaces which diverge radially outward with respect to the clamping shoulders on the clamping shank side.

61. The device as claimed in claim 60, wherein the clamping shoulders toward the hollow tool shank side of the clamping elements are delimited in the circumferential direction by substantially radially oriented delimiting edges.

62. The device as claimed in claim 60, wherein the clamping shoulders on the hollow tool shank side of the clamping elements are delimited in the radial direction by a delimiting edge oriented substantially in the circumferential direction.

63. The device as claimed in claim 60, wherein at least one of the delimiting edges is convexly rounded or beveled.

64. The device as claimed in claim 58, wherein the clamping shoulders of the clamping elements include a central angle, with respect to a clamping shank axis of from 30° to 120° with one another.

65. The device as claimed in claim 58, wherein the clamping insert, in the locking position, is secured against rotation by a locking bolt that penetrates through the clamping surface of the clamping shank in an axially parallel direction and engages in the form-fitting manner in a recess open at a radial edge, in one of the clamping elements.

66. The device as claimed in claim 57, wherein the clamping insert is fitted into the clamping shank and rotated through 180° to be locked therein.

67. The device as claimed in claim 32, wherein the centering element at the clamping shank end includes an axially central pocket for holding the spring loop, which forms the flexural joint and projects axially beyond the clamping insert to float in the axial and radial directions.

68. The device as claimed in claim 36, wherein the centering element on the clamping shank end includes an axially central pocket for holding the ends of the clamping elements on the clamping shank end to provide the tilting axis and to project axially beyond the clamping insert to float in the axial and radial directions.

69. The device as claimed in claim 68, wherein the axially projecting ends at the clamping shank side of the clamping elements, in the clamping position, complement one another to form a conical outer surface that tapers toward the clamping shank and, in the release position, complement one another to form a cylindrical outer surface.

70. The device as claimed in claim 1, wherein the hollow tool shank has an outer surface that tapers conically toward its free end, and the seat of the clamping shank has a corresponding conicity.

71. The device as claimed in claim 1, wherein the hollow tool shank is delimited by a planar surface comprising an annular shoulder and, in the clamping position of the clamping elements is capable of being pressed against an annular planar surface of the clamping shank.

72. The device as claimed in claim 1, wherein a free end of the hollow tool shank has at least one groove for a driver, and wherein the clamping shank includes at least one bore laterally offset with respect to an axial plane for holding a bending bolt that engages in the groove or in a recess in the hollow tool shank.

73. A device for connecting a tool head including a hollow tool shank to a clamping shank having a seat for receiving the hollow tool shank, a clamping mechanism having at least two clamping elements arranged at an angular distance from one another and, in a clamping position, connecting the hollow tool shank and the clamping shank to one another in a force-fitting manner, and an actuating mechanism for limited displacement of the clamping elements between a release position and the clamping position, wherein a free end of the hollow tool shank has at least one groove for a driver to engage in, and wherein the clamping shank includes at least one bore laterally offset with respect to an axial plane for holding a bending bolt that engages in the groove or in a recess in the hollow tool shank.

74. The device as claimed in claim 73, wherein the bore comprises a threaded bore for receiving the bending bolt which has a screw thread.

75. The device as claimed in claim 74, wherein the bending bolt has a threaded section, a bending section and a driver section that is thickened at an end of the bending section.

76. The device as claimed in claim 72, wherein two bores arranged mirror-symmetrically with respect to the axial plane are provided for receiving the bending bolt.

77. The device as claimed in claim 41, wherein the pressure-exerting pieces on mutually facing sides delimit a gap into which an ejector wedge projects at a tool shank end of the centering element and is capable of being subjected to an axial force under the action of the pressure-exerting pieces.

78. The device as claimed in claim 77, wherein gap edges of the pressure-exerting pieces that face toward the ejector wedge are beveled in a wedge receiving shape.

79. The device as claimed in claim 55, including a closure ring that engages around an outer surface of the clamping shank for displacement in an axial direction to a limited extent with respect to the clamping shank between a first limit position in closing off the apertures and a second limit position opening the apertures.

80. A device for connecting a tool head having a hollow tool shank to a clamping shank having a seat for receiving the hollow tool shank, a clamping mechanism having at least two claw-shaped or clip-shaped clamping elements spaced at an angular distance from one another and having one end for insertion into the seat of the clamping shank and an opposing end for extending into the interior of the hollow tool shank to be clamped in place, the clamping elements being supported by two clamping shoulders arranged at an axial distance from one another and facing toward one another on clamping surfaces arranged in the interior of the clamping shank and the hollow tool shank and facing away from one another, and an actuating mechanism for displacing the clamping elements between a release position and a clamping position, wherein the clamping shank and the hollow tool shank have apertures flush with one another enabling a screwdriver to pass through in order to reach the actuating mechanism, and wherein a closure ring that engages around an outer surface of the clamping shank is sealable with respect to the clamping shank at its two edges and is displaceable in an axial direction to a limited extent with respect to the clamping shank between a first limit position closing off the apertures and a second limit position opening the apertures.

81. The device as claimed in claim 80, wherein the clamping shank in a region of the apertures includes an annular turned groove adjoined via one annular step, by a run-up area of larger diameter toward an end of the clamping shank and by a guide area of larger diameter toward a root of the clamping shank, and wherein the closure ring comprises a sealing ring that bears against the outer surface of the clamping shank in the annular turned groove and in the guide area.

82. The device as claimed in claim 81, wherein, in the closed position of the closure ring, at least one of a pair of sealing rings is latched into an annular latching indentation in the clamping shank.

* * * * *